(12) United States Patent
Karasin et al.

(10) Patent No.: US 9,336,688 B2
(45) Date of Patent: May 10, 2016

(54) TACTILE DISPLAY AND OPERATING SYSTEM THEREFOR

(75) Inventors: Igor Karasin, Ra'anana (IL); Gavriel Karasin, Ra'anana (IL)

(73) Assignee: TACTILE WORLD LTD., Ra'Anana (IL)

( * ) Notice: Subject to any disclaimer, the term of this patent is extended or adjusted under 35 U.S.C. 154(b) by 275 days.

(21) Appl. No.: 14/000,608

(22) PCT Filed: Mar. 4, 2012

(86) PCT No.: PCT/IL2012/050070
§ 371 (c)(1),
(2), (4) Date: Aug. 21, 2013

(87) PCT Pub. No.: WO2012/120508
PCT Pub. Date: Sep. 13, 2012

(65) Prior Publication Data
US 2013/0330692 A1    Dec. 12, 2013

Related U.S. Application Data

(60) Provisional application No. 61/457,358, filed on Mar. 7, 2011.

(51) Int. Cl.
*G09B 21/00* (2006.01)
*G06F 3/01* (2006.01)

(52) U.S. Cl.
CPC .............. *G09B 21/004* (2013.01); *G06F 3/011* (2013.01); *G06F 3/016* (2013.01)

(58) Field of Classification Search
CPC ........ G06F 3/011; G06F 3/016; G09B 21/004

USPC ................... 345/156; 434/112–114
See application file for complete search history.

(56) References Cited

U.S. PATENT DOCUMENTS

| | | | |
|---|---|---|---|
| 4,871,992 A | 10/1989 | Petersen | |
| 7,018,209 B2 * | 3/2006 | Schleppenbach .... | G09B 21/004 148/580 |
| 7,436,388 B2 * | 10/2008 | Hillis ..................... | G09F 9/372 345/108 |
| 2003/0117371 A1 * | 6/2003 | Roberts .................. | G06F 3/014 345/156 |
| 2005/0069842 A1 | 3/2005 | Schleppenbach et al. | |
| 2005/0098044 A1 * | 5/2005 | Spedden .............. | G09B 21/004 99/325 |
| 2009/0023116 A1 | 1/2009 | Shaw | |
| 2012/0236134 A1 * | 9/2012 | Keyes .................... | G06K 9/228 348/62 |

FOREIGN PATENT DOCUMENTS

DE            2501712         7/1976

* cited by examiner

*Primary Examiner* — Amare Mengistu
*Assistant Examiner* — Vinh Lam
(74) *Attorney, Agent, or Firm* — JMB Davis Ben-David

(57) ABSTRACT

A tactile display includes a base; movable pins having free ends for tactile sensing by a user, the pins arranged in rows and columns and movable between an extended position and retracted position with respect to the base so as to selectively display tactilely sensible data; a resilient element for supporting each pin in the extended position when at rest, and further operative to urge the pin from the retracted position to the extended position in the presence of an opposing force; one or more reset elements for lowering the pins from the extended position to the retracted position; row stoppers for lockably engaging rows of pins when in the second position.

14 Claims, 23 Drawing Sheets

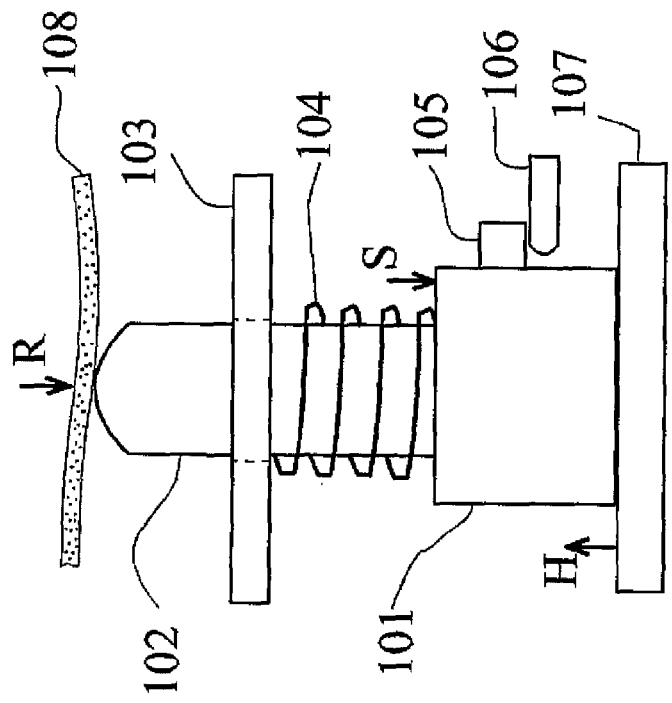
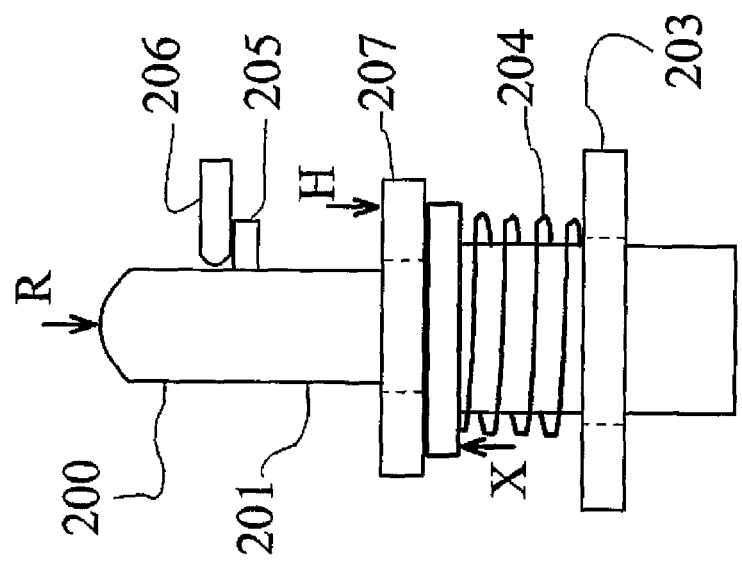

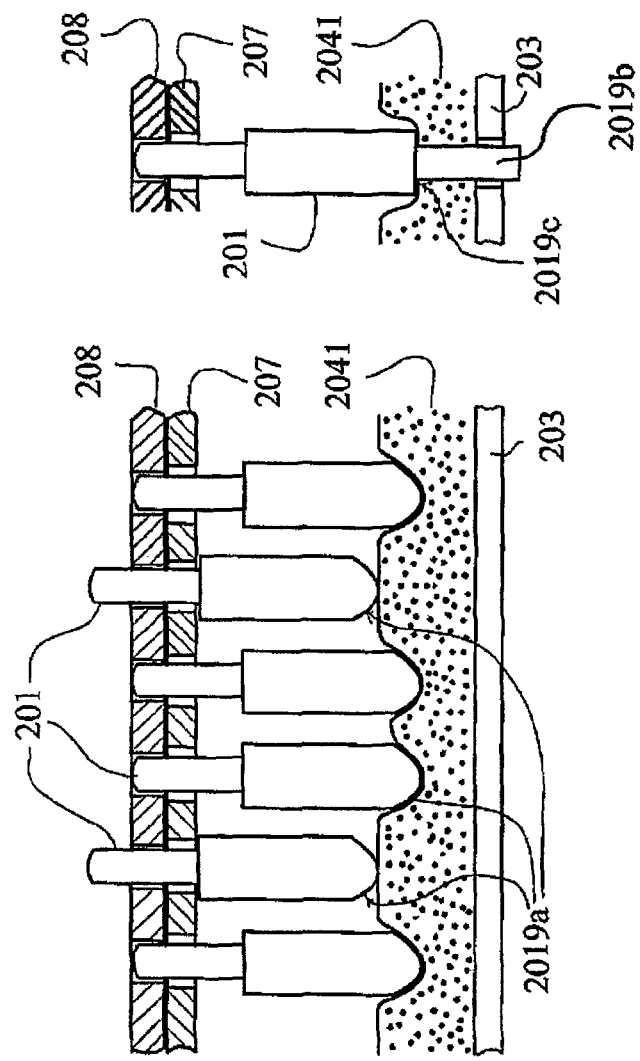

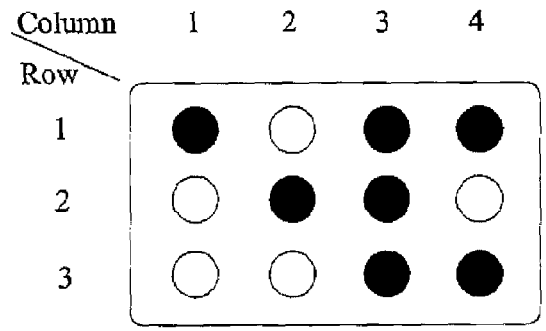
FIG. 13
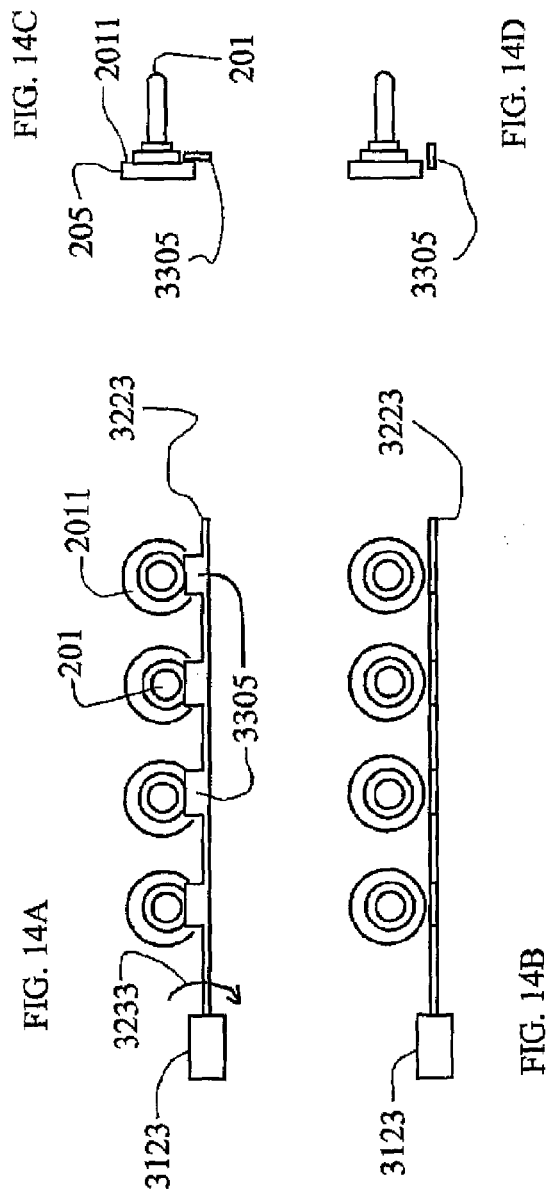

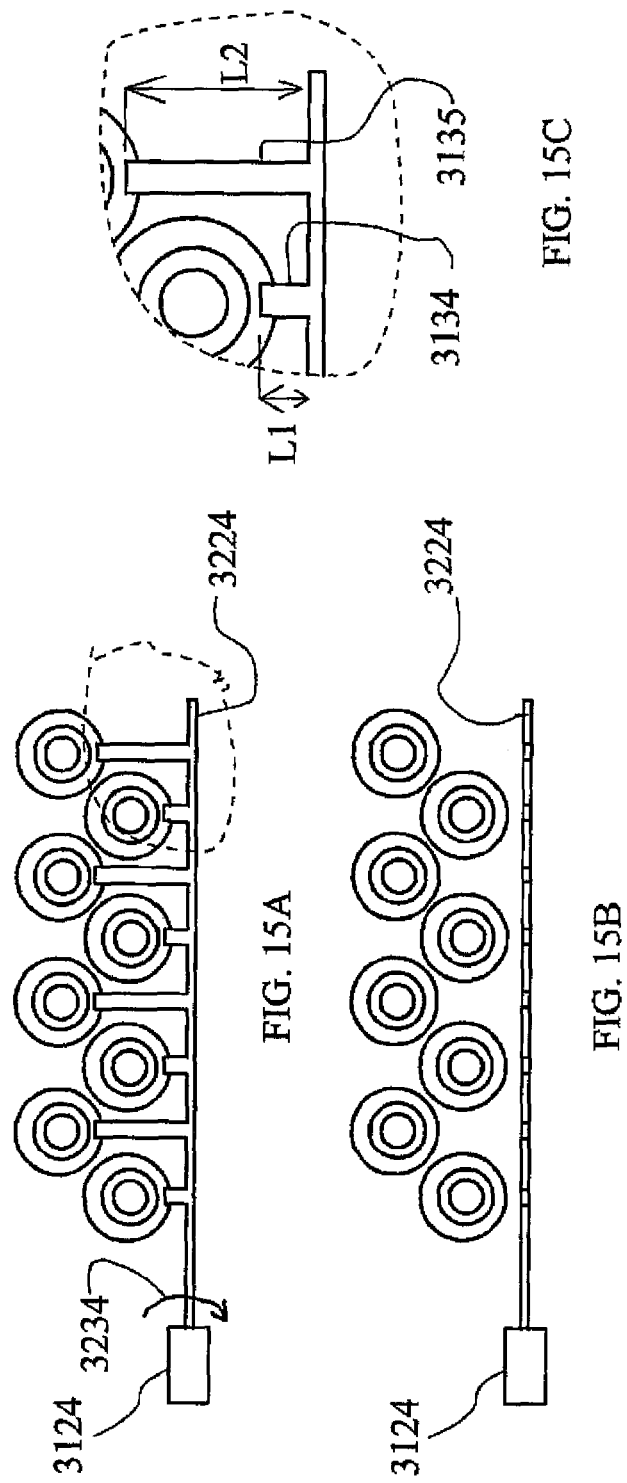

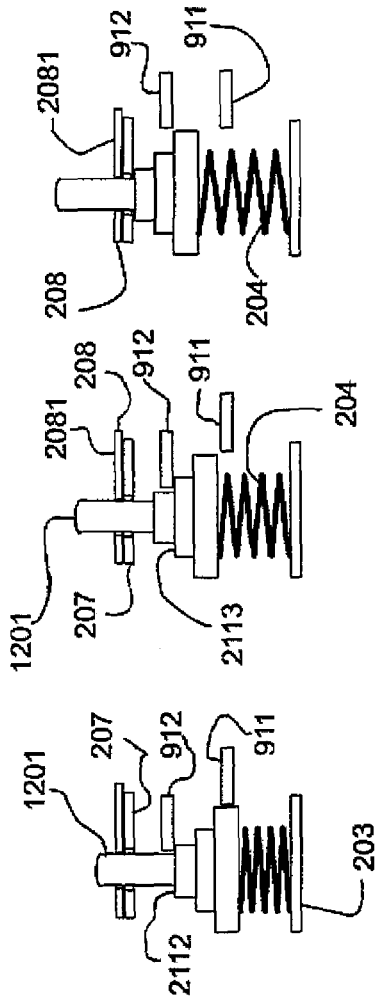

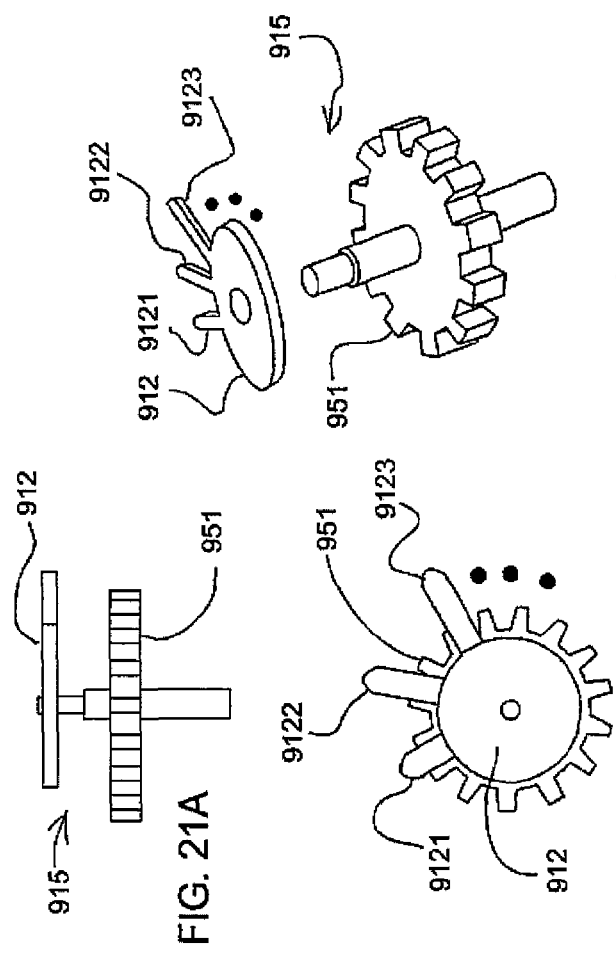

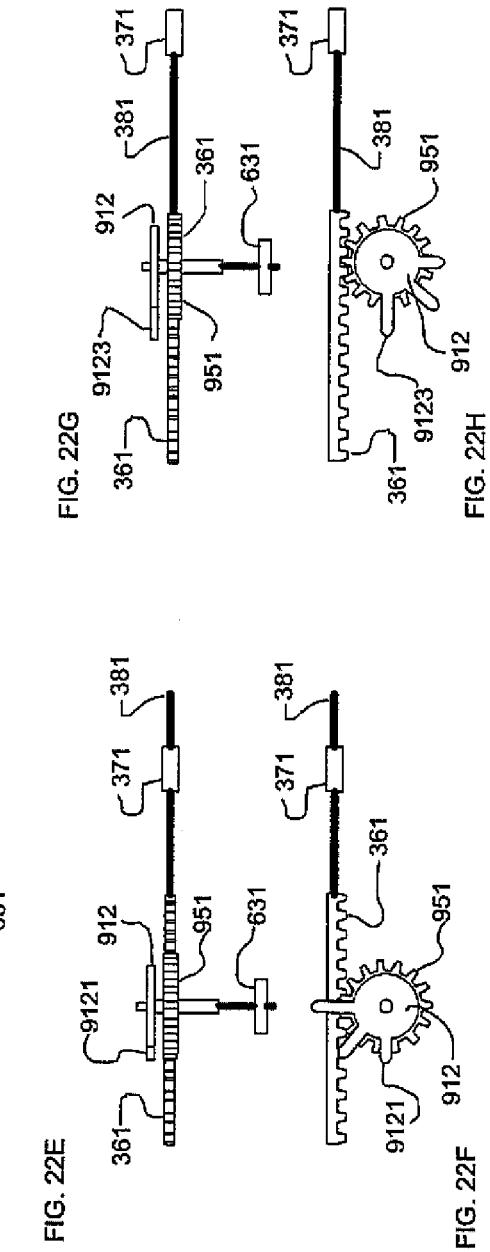

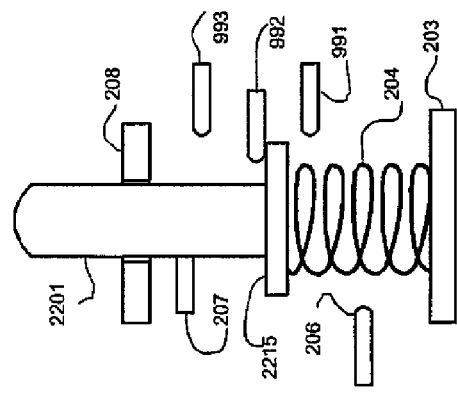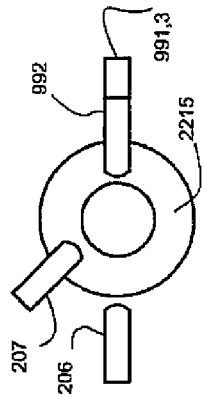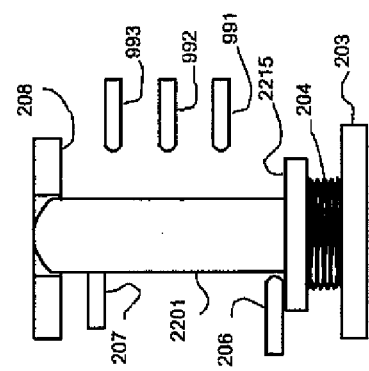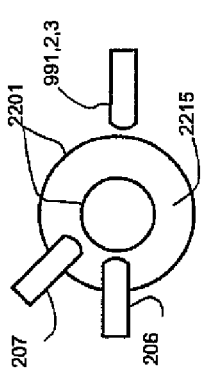

TACTILE DISPLAY AND OPERATING SYSTEM THEREFOR

CROSS-REFERENCE TO RELATED APPLICATIONS

This is the U.S. National Stage of International Application No. PCT/IL2012/050070, filed Mar. 4, 2012, which was published in English under PCT Article 21(2), which in turn claims the benefit of U.S. Provisional Application No. 61/457,358, entitled "Tactile Display And Operating System Therefor" and filed on Mar. 7, 2011.

FIELD OF THE INVENTION

The present invention relates in general to apparatus and methods for controlling a tactile display. More specifically, the present invention relates to apparatus and methods for controlling a tactile display for use by the visually impaired, and/or by sighted users.

BACKGROUND

Definition: In the present disclosure, the term "tactile display" is intended to refer to a display having a plurality of pins moving through a reference plane so as to be relatively raised or non-raised with respect thereto, and whose relative position of extension may be sensed by touch, typically by a person's fingers, although optionally by other body portions. In the present context, the "reference plane" may be flat or curved, and may be 'real', namely, defined by the surface of a physical element, or virtual.

The visually impaired typically require specialized interfaces for interacting with a computer as well as with other electronic devices, such as cellular phones. Tactile display devices are used to provide a tactile output for displaying information to computer users who are visually impaired, for example, by converting text to a format, such as Braille, that can be felt by the user.

Representative of the prior art, is U.S. Pat. No. 7,436,388 to Hillis et al, in which there is described a tactile display employing a plurality of pins for selectable movement so as to deform a flexible display surface thereon. Referring to FIG. 2, Hillis teaches a rectangular pin array arranged in rows and columns. As opposed to more traditional Braille displays in which a single actuator is provided for each pin, Hillis provides a system in which the number of actuators is equal to number of rows plus number of columns plus one. All of the pins 101 have relatively narrow stem portions 102 which protrude through a stationary plate 103. Each pin 101 employs a compression spring 104 which is adapted to urge it into a normally closed or down position, with respect to plate 103. A single movable pushing plate 107 is employed to raise the entire plurality of pins 101 in the array by applying a force H, against the urging S of the springs 104, and against a force R applied by the user and the self weight of the flexible display surface 108 which overlays the free end of the pin. Each pin 101 further includes a leveler or protrusion 105 which cooperates with a stopper 106 so as to prevent a downward movement of the pin 101 beyond a predetermined position.

Disadvantages of such configuration include the following:

1. In order to move a plurality of k pins from their lowest, retracted positions to their starting/extended positions, an actuator of the pushing plate 107 must work against external forces R which are applied to the top end of the pins 102 and the compressive resistance of the springs i.e. $H > k*(R+S)$. Therefore, in practice, so as not to inadvertently prevent the extension of selected pins during a refreshing of the display, the user has to remove his fingers from the display at that time.
2. The leveler 105 of each pin 101 and each associated stopper 106, work not only against the compressive force of spring 104, but also against external forces, as described. As the overall construction of this prior art display is relatively delicate, and when this external force exceeds a certain limit, this can lead to the mechanical failure of the pin, as well as distortion of the leveler and/or stopper.
3. For multi-level displays, if R+S is too big, the pin may be pushed beyond a required location so as to inadvertently change the information sought to be displayed.

Among other disadvantages of prior art generally, are high costs due to the large number of actuators required, the large amount of energy required for operation, long display refresh time.

SUMMARY OF EMBODIMENTS

For some applications of the present invention, apparatus and methods are provided for controlling the pins of a tactile display device for use by the visually impaired, and/or by sighted subjects. For example, in response to the location of a cursor on a computer screen, selected pins of the tactile interface are moved, in order to provide a tactile representation of text or a graphic on the computer screen. Alternatively and additionally, pins on a tactile display of an electronic device, such as a cellular phone, are controlled, in order to provide a sensible tactile output to a user.

In accordance with some applications of the present invention, the present invention represents an improvement over prior art by providing a tactile display whose pins are controlled in a manner that (a) reduces the number of actuators, and thereby reduces the financial cost associated with controlling movement of the pins; (b) reduces the energy expenditure associated with the controlling movement of the pins; (c) increases the speed with which the movement of the pins is controlled thereby facilitating refreshing or changing the tactile image frames that are displayed by the device in real time, for example, based upon the location of a cursor; and/or (d) facilitates an increase in the density of a plurality of pins in the array.

There is thus provided, in accordance with an embodiment of the present invention, a base;

a movable pin having a free end for tactile sensing by a user;

a resilient element for supporting the pin on the base between a first, extended position relative to the base and a second, retracted position, the resilient element being operative to support the pin in the first position when at rest, and being further operative to urge the pin from the second position to the first position in the presence of an opposing force; and a selectably actuable stopper for lockably engaging the pin when in the second position.

Additionally in accordance with an embodiment of the invention, the resilient element applies an urging force having an axial component equal to X, the pin being susceptible to move from the first position to the second position in the presence of an opposing force having an axial component Y, wherein $Y > X$, and wherein the pin construction also includes a reset element for selectably forcing the pin from the first position to the second position by application to the pin of a variable force $\delta$ wherein $X<\delta \leq Y$.

Further in accordance with an embodiment of the invention, the pin is susceptible to application thereto of an axial component of a force F applied to its free end by a user, and wherein $\delta=Y-F$.

Additionally in accordance with an embodiment of the invention, the pin has one or more engagement portions formed thereon, for engagement by the stopper.

Further in accordance with an embodiment of the invention, the first and second positions define the maximum range of movement of the pin, the selectably actuable stopper is a main stopper, and wherein the pin construction also includes one or more additional stoppers for lockably engaging the pin in one or more intermediate positions, between the first and second positions.

Additionally in accordance with an embodiment of the invention, the pin has a first engagement portion formed thereon for engagement by the main stopper, and at least a second engagement portion formed thereon for engagement by the one or more additional stoppers.

There is further provided, in accordance with an alternative embodiment of the present invention, a base;

a plurality of movable pins having free ends adapted for tactile sensing by a user, the plurality of movable pins being arranged in rows and columns such that each pin is locatable in a predetermined row and column, each pin being movable between a first, extended position and a the second, retracted position with respect to the base so as to selectively display tactilely sensible data;

a resilient element for supporting each pin in the first position when at rest, and being further operative to urge the pin from the second position to the first position in the presence of an opposing force;

one or more reset elements for selectably lowering the plurality of pins from the first, relatively raised position to the second, relatively lowered position;

a plurality of selectably actuable row stoppers for lockably engaging the rows of pins when in the second position; and a plurality of selectably actuable column stoppers for lockably engaging the columns of pins when in the second position, such that each pin remains in the second position, even after disengagement therefrom by one of the row stoppers or one of the column stoppers.

Further in accordance with an alternative embodiment of the invention, each row stopper and each column stopper has a single actuator, such that the total number of actuators employed for the plurality of row stoppers and the plurality of column stoppers equals R+C, wherein R=the total number of rows, and C=the total number of columns.

Additionally in accordance with an alternative embodiment of the invention, there are also provided:

two or more actuators for the plurality of row stoppers, and two or more actuators for the plurality of column stoppers.

Further in accordance with an alternative embodiment of the invention, a set of Sr row stoppers is controlled by a single set Ar of row actuators, and a set of Sc column stoppers is controlled by a single set Ac of column actuators, wherein either or both of the following conditions applies:

(i) Ar<Sr and (ii) Ac<Sc such that the total number of row actuators and column actuators is less than the total number of row and column stoppers.

Additionally in accordance with an alternative embodiment of the invention, the resilient support applies to each pin an urging force having an axial component equal to X, the pin being susceptible to move from the first position to the second position in the presence of a force having an axial component Y, wherein Y>X, and wherein the reset is selectably operable to force the pin from the first position to the second position by application thereto of a variable force $\delta$ wherein $X<\delta \leq Y$.

Further in accordance with an alternative embodiment of the invention, the pin is susceptible to application thereto of an axial component of a force F applied to its free end by a user, and wherein $\delta=Y-F$.

Additionally in accordance with an alternative embodiment of the invention, each pin has at least two engagement portions formed thereon, for selectable engagement by one of the following:

one of the row stoppers, one of the column stoppers, or one of the row stoppers and one of the column stoppers.

Further in accordance with an alternative embodiment of the invention, the first and second positions define the maximum range of movement of each pin, the selectably actuable row and column stoppers are main stoppers, and wherein the tactile display also includes one or more additional pluralites of row stoppers and one or more additional pluralities of column stoppers for lockably engaging the pins in one or more intermediate positions, between the first and second positions.

Alternatively, the first and second positions define the maximum range of movement of each pin, and each pin has a first engagement portion formed thereon for engagement by the main stoppers, and one or more additional engagement portions formed thereon, and the tactile display also includes one or more additional pluralities of row stoppers and one or more additional pluralities of column stoppers for lockably engaging the one or more additional engagement portions of each pin so as to lock the pins in one or more intermediate positions, between the first and second positions.

The present invention will be more fully understood from the following detailed description of embodiments thereof, taken together with the drawings, in which:

BRIEF DESCRIPTION OF THE DRAWINGS

FIG. 2 is a schematic depiction of a PRIOR ART tactile pin construction;

FIG. 3 is a schematic depiction of a tactile pin constructed in accordance with an embodiment of the present invention;

FIGS. 9A and 9B are schematic representations of pin constructions in which the compression element is a single compressible member serving a plurality of pins;

FIG. 13 is an example of a tactile image displayed by an array of pins, some of which are raised (black) and some of which are lowered (white);

FIGS. 14A and 14B are schematic illustrations of respective views of a further modification of a row stopper for stopping a row of pins from becoming raised, the stopper being shown in a closed position, in accordance with some embodiments of the present invention;

FIGS. 14C and 14D are cross sectional views of the stopper shown in FIGS. 14A-B

FIGS. 15A and 15B are schematic illustrations of a space-saving row stopper for facilitating dense packing of pins, respectively, in open and closed positions, in accordance with some embodiments of the present invention;

FIG. 15C is an enlarged view of a portion of the pin and stopper arrangement shown in FIG. 15A;

FIGS. 20A-20E depict a tactile pin adapted for the display of multi-level tactile images;

FIGS. 21A and 21B are side and plan views respectively of a rotating 'stopper' used for the control of a multi-level pin such as shown in FIGS. 20A-20E;

FIG. 21C is an exploded view of the stopper of FIGS. 21A and 21B;

FIGS. 22A-22H demonstrate the operation of the rotating stopper of FIGS. 21A-21C, used to control the multi-level pin depicted in FIGS. 20A-20E;

FIGS. 23A-23D show a tactile pin adapted for the display of multi-level tactile images, in accordance with an alternative construction.

DETAILED DESCRIPTION OF EMBODIMENTS

Reference is now made to FIGS. 1A-D, which are schematic illustrations of various applications of tactile display devices 10 that include arrays 12 of pins 201.

Typically, device 10 provides a tactile output to a visually impaired user. For example, device 10 may provide a tactile output in response to the position of a cursor on a computer screen, or in response to a command to change a tactile image. Further by way of example, the operating system of an electronic device, such as a cellular phone, may drive the display to generate a tactile image in order to provide an output to a user. It is noted that, in general, although many applications of the present invention are described herein with reference to a display that is used to provide an output from a computer to a visually impaired user, the scope of the present invention includes using the methods and apparatus described herein in conjunction with any tactile display device. For example, the scope of the present invention includes using the methods and apparatus described herein with the devices shown in FIGS. 1C-D, as described below.

Device 10 is a tactile display as defined hereinabove. The positions of the pins with respect to an upper surface of the device 10 touchable by user are modified in response to the location of the cursor, or in response to different commands, as described hereinabove. For example, a given arrangement of pins may be raised and lowered in order to generate a Braille character, the character corresponding to a text character that is in the vicinity of the location of the cursor. Alternatively, a given arrangement of pins on the tactile display may be arranged to correspond to a graphic on the computer screen in the vicinity of the cursor. In this sense, a 'graphic' could include both static and moving images, including images for providing instructions to a user, for example, animated arrows indicating a direction of movement. In some applications, device 10 is used to provide a tactile output to a fully sighted or a partially sighted computer user to form an additional output channel.

Figure 1A:
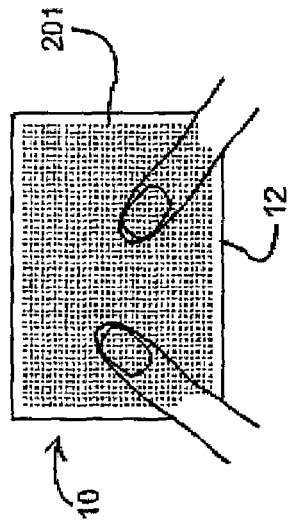
FIGS. 1A-D are schematic illustrations of tactile display devices that include arrays of pins, in accordance with some applications of the present invention.
Figure 1C:
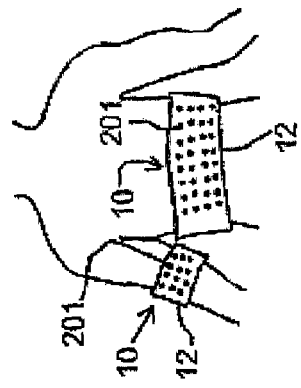
Figure 1B:
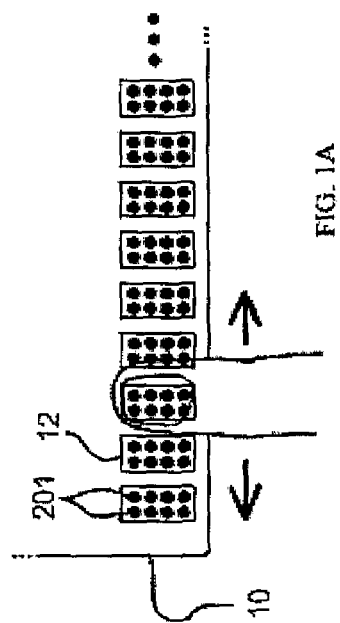

In accordance with some embodiments of the invention, device 10 may be a refreshable Braille display, as shown in FIG. 1A. Typically, such a display consists of plurality of Braille cells 12 each having typically 6 or 8 pins 201. The pins can be raised and lowered in order to display a single Braille symbol on one cell 12, at one time. In order to read, the user typically moves his or her finger along the display in a left to right direction for all languages. A movement in the opposite direction, right to left, would normally be in order to find a mistake or clarify something, for example. Alternatively or additionally, device 10 may be a tactile display that is integrated into a computer mouse, as shown in FIG. 1B. For example, the computer mouse may be a device that is generally described in the following patent publications: US Patent Application No. 2010/0134416 to Karasin et al., U.S. Pat. No. 6,762,749 to Gouzman et al., U.S. Pat. No. 6,278,441 to Gouzman et al., and/or U.S. Pat. No. 5,912,660 to Gouzman et al., all of which references are incorporated herein by reference. As described in these publications, the user puts his/her fingers on tactile displays 12 having a plurality of pins 201 and moves the mouse in a way similar to regular computer mouse. Such a mouse can be used both for output Braille symbols and for displaying tactile images. It is noted that the tactile display integrated into computer mouse may be for use by the visually impaired and/or by sighted users.

In accordance with some embodiments of the invention, ubiquitous electronic devices such as a cellular phone, or a tablet computer may be equipped with one or more tactile displays, for use by the visually impaired and/or by sighted users. For example, FIG. 1C shows a portion of a mobile or wireless device that includes a tactile display comprising an array 12 of pins 201. For some applications, the tactile display that is used with such devices has a relatively dense arrangement of pins in order to facilitate the display of detailed images by the device.

Figure 1D:
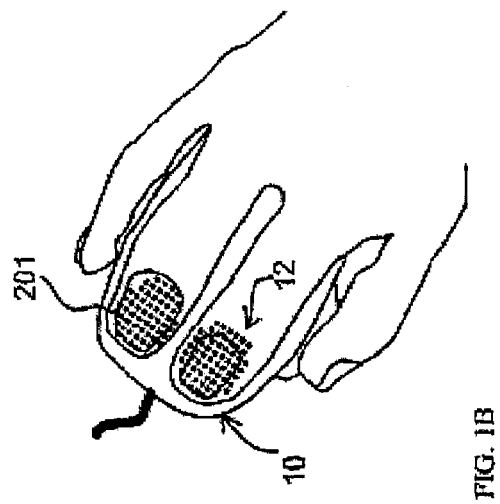

In accordance with alternative embodiments of the invention, device 10 is configured to provide a tactile output to a portion of a user's body, other than the user's fingers. For example, FIG. 1D shows tactile displays for providing outputs to a user's torso and/or a user's arm.

The methods and apparatus described herein for controlling an array of pins of a tactile display device may be used with any one of the tactile display devices shown in FIGS. 1A-D, and/or any other tactile display devices that may be adapted for use by the visually impaired and/or by partially or fully sighted users.

Reference is now made to FIG. 3 which is a schematic illustration of the construction of a single pin 201, constructed in accordance with an embodiment of the present invention. It will be appreciated that pin 201 is a single pin of an array of pins which would be used in a tactile display.

As seen, pin 201 protrudes through a stationary plate 203 and is urged away from this plate i.e. from its normally closed or retracted position by an intervening spring 204. Pin 201 is retained in the illustrated retracted position by blocking engagement of leveler 205 with stopper 206 which prevents leveler 205 from moving past it in an upward direction, so as to limit the upward movement of pin 201 accordingly. A movable plate or reset element 207 is provided in order to retract pin 201 from its upper, raised or extended position to its initial or retracted position. In the illustrated arrangement, and in contrast to the prior art, the movable plate 207 is moved by an actuator (not shown) so as to lower the pin, which works only against the compression force of the spring 204, while the external force R works in the same direction as the movable plate 207, thereby reducing the work that has to be done by the actuator and helping the actuator to overcome the resistance of the spring.

It is thus seen that the leveler 205 and stopper 206 work only against the spring 204 and in the same direction as external force R, rather than opposite thereto as in the prior art. In contrast to the prior art, if R increases, for example, by a user applying too much force, the pin retracts freely without being in danger of buckling, and without risk of the leveler and/or stopper being damaged, and when R decreases again, the pin returns back to its previous position under the force of the compression spring.

Figure 4C:
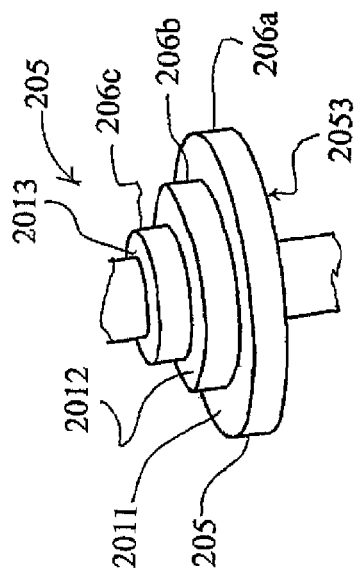
FIG. 4C shows the engagement portion of the pin seen in FIGS. 4A and 4B, in enlarged detail.
Figure 4B:
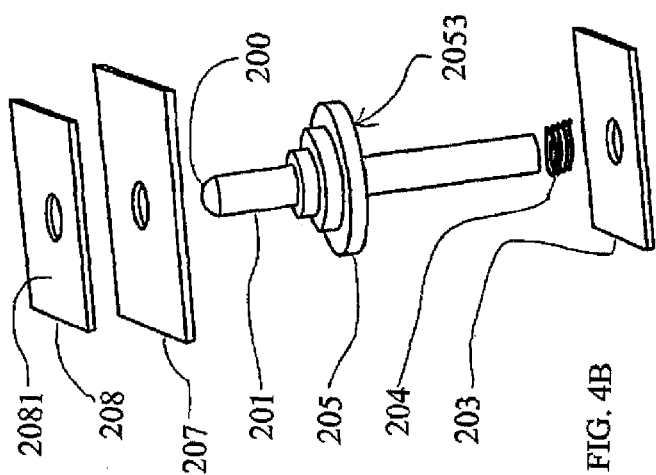
FIGS. 4A and 4B are schematic illustrations of a pin construction in accordance with the present invention, shown in assembled and exploded views, respectively.
Figure 4A:
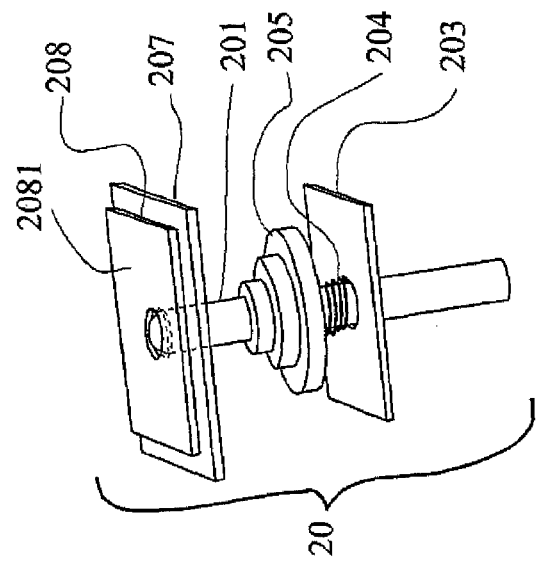

Also depicted in FIG. 3 are the forces which are applied as the pin 201 moves between raised and lowered states, and which, in contrast to Hillis et al, described above, clearly take advantage of the force R applied by a user to the free end 200 of the pin so as to reduce the energy required to reset the pins. These can be described, as follows:

a. the resilient element 204 supports the pin 201 on the base 203 between a first, relatively raised position relative to the base 203 and a second, relatively lowered position (not shown) so as to always be applying an axial force X to the pin 201, except when it is at rest, in its raised position;
b. in the presence of a compressive force, the resilient element 204 urges the pin 201 from the second, lowered position to the first, raised position;
c. the pin 201 is susceptible to move from the first, raised position to the second, lowered position in the presence of a force having an axial component Y (not indicated in the drawing), wherein Y>X;
d. the reset element 207 is used to force the pin 201 from the raised position to the lowered position by application to the pin 201 of a variable force $\delta$ wherein $0 \leq \delta \leq Y$;
f. the pin 201 is susceptible to application thereto of an axial component of a force R applied to its free end by the finger of a user, and wherein $Y=\delta+R$ Reference is now made to FIGS. 4A and 4B, which are detailed illustrations of the construction 20 of pins 201 such as employed in any of devices 10 (FIGS. 1A-1D), in accordance with some applications of the present invention. Each pin 201 is disposed between upper and lower plates, respectively referenced 208 and 203 which form part of a display housing, and thus are typically immobile with respect to one another. Plate 208 defines an upper surface 2081 through which pins 201 are adapted to extend and which typically coincides with the upper surface of device 10. Typically, control mechanisms for controlling the movement of the pins are also housed within device 10, and are operative as described hereinbelow.

It is noted also that while the terms "upper" and "lower" are used herein to variously describe plates, locations and states, these terms are relative to the display which can be oriented in different directions. For all such cases the term "upper" relates to an exterior surface of a tactile display which is touchable by a user's fingers or other part of his body. Similarly, where a pin is described as having a "raised" or "lowered" state or position, a raised state is one in which a pin extends through the exterior surface 2081 of a tactile display, so as to be touchable by a user touching the display; and a lowered state or position is one in which a pin is non-extended relative to the exterior surface of a tactile display, so as not to be touchable by a user touching the display.

In accordance with additional embodiments of the invention, as shown and described hereinbelow, the pins may also be partially raised to intermediate heights, so as to signify different colors or grey shades, or so as to impart other information to the user.

The pin 201 is a typically cylindrical rod-shaped element having at least one laterally protruding engagement portion 205 which protrudes generally midway along its length or closer to one end of the pin. Engagement portion 205 typically has one or more additional, graduated portions 206a, 206b and 206c (FIG. 4C), each extending radially from the pin and adapted to be used in conjunction with differently configured "stoppers" to control the limit of movement of the pin, as described hereinbelow. While engagement portion 205 is formed with three graduated portions as described herein particularly in the embodiment described in conjunction with FIGS. 6A-6C, additional graduated portions may also be provided, as required.

For a better understanding of pin construction 20, it is shown in exploded view in FIG. 4B, wherein the graduated portions are shown to have rounded forms, by way of non-limiting example.

A resilient compression member 204, exemplified as a compression spring, also seen in FIG. 3, is disposed between stationary lower plate 203 and a downward-facing surface 2053 (FIGS. 4B and 4C) of engagement portion 205. In order to lower or retract the pin, a movable reset plate 207 is operated to push downward on a top surface 2013 (FIG. 4C) of the engagement portion 205. It is noted that in accordance with the illustrated example in which there are provided graduated portions 206a, 206b and 206c (FIG. 4C), lower portion 206a has an upper surface 2011, intermediate portion 206b has an upper surface 2012, and uppermost portion 206c has an upper surface 2013. The functions of these surfaces are described hereinbelow in conjunction with FIG. 5.

Referring now briefly to FIGS. 9A and 9B, resilient compression member 204 may be a unitary, generally planar compression member 2041 located on lower plate 203, and formed of any suitable compressible material, such as a suitable foam, rubber or equivalent. In FIG. 9A, it is seen that pins 201 are formed with lower free ends 2019a that are positioned in contact with planar compression member 2041 so as to be normally urged thereby away from lower plate 203. A particular advantage of the present embodiment in which the individual compression members 204 are replaced by a single compression member 2041 significantly reduces the number of components required in a tactile display constructed in accordance with the present invention, thus lowering the cost, both of the components and of their assembly.

In FIG. 9B, there is seen an alternative embodiment in which free end 2019b of pin 201 is elongated and narrowed relative to a thicker central portion 201a of pin 201. In this embodiment, both compression member 2041 and lower plate 203 are formed with apertures, each adapted to receive the free end 2019b of pin 201 therethrough. As seen, an annular shoulder 2019c contacts planar compression member 2041 such that the pin 201 is normally urged thereby away from lower plate 203. A further advantage of the present embodiment, is the increased stability relative to the embodiment of FIG. 9A, due to the fact that pin 201 is supported laterally at both ends.

In accordance with alternative embodiments, a plurality of slits (not shown) formed at different levels on the pins are used instead of the protrusions 205, the pins being held at the required levels by the insertion of one or more holding elements into corresponding slits. In yet further embodiments, other pin constructions may be used to facilitate holding the pins at a plurality of levels, as may occur to one skilled in the art.

As described above, pin 201 has at least one raised state in which the pin protrudes from upper surface 2081 (FIG. 4A) and at least one lowered state in which the pin is lowered. It is noted that, for some applications, even in the pin's lowered state, it may still protrude from surface 2081, but by a lesser extent than in the raised state of the pin. Typically, in its lowered state, the top of the pin is level with surface 2081. Also, as described herein, the pin may have a plurality of intermediate states between the raised state and the lowered state. This is described in detail hereinbelow with reference to FIGS. 20A-24.

Figure 6A:
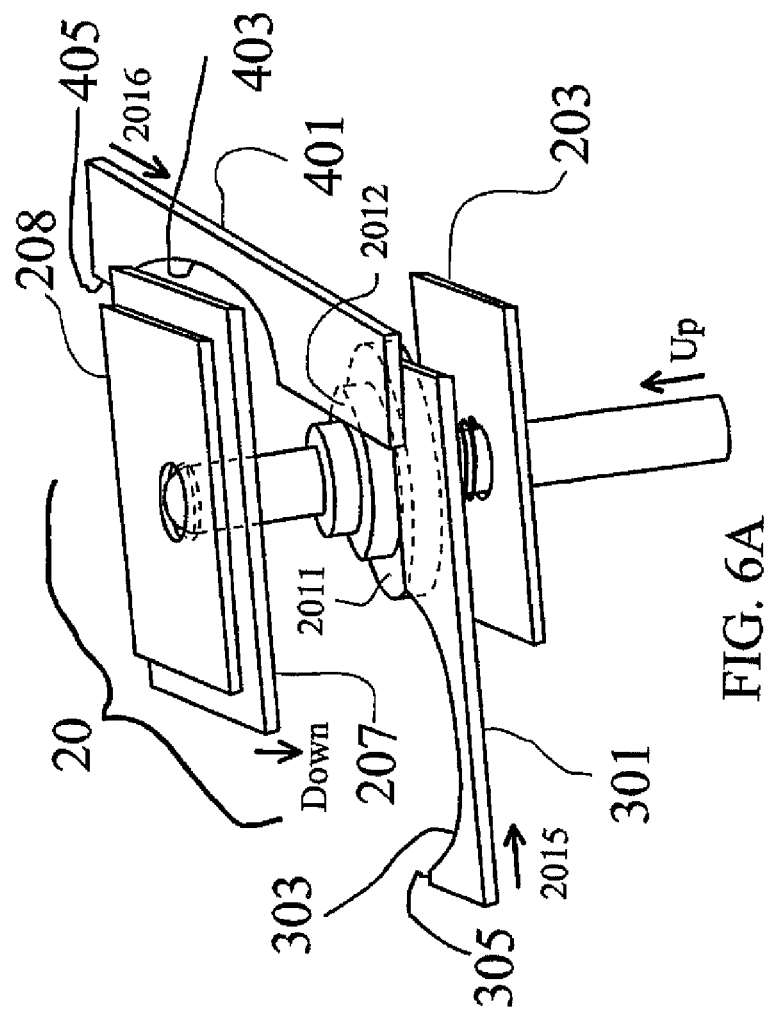
FIGS. 6A-C are schematic illustrations of the movement of a pin being controlled in accordance with some applications of the present invention.
Figure 6B:
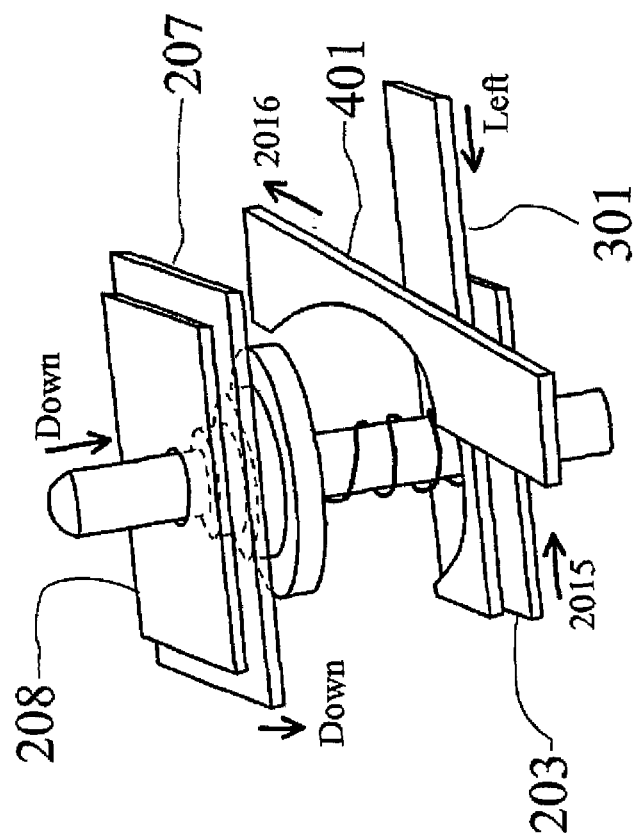
Figure 6C:
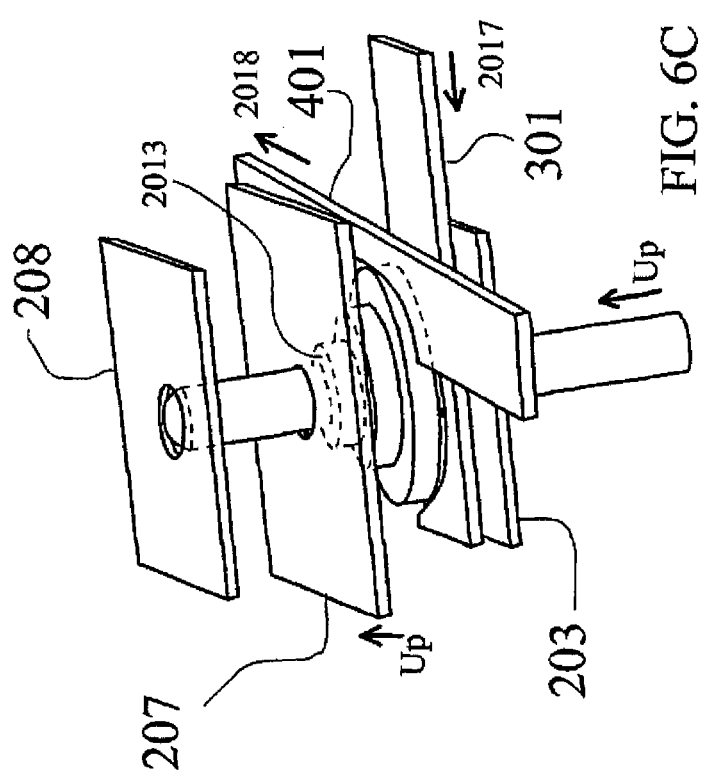

Reference is now made to FIGS. 6A-6C, which show a method of controlling the movement of a single pin 201 of an array of pins 201 formed of rows and columns, in accordance with an embodiment of the present invention. In accordance with an embodiment of the present invention, the movement of the pins in the array is controlled by a plurality of row stoppers 301 and column stoppers 401, wherein the number of both row stoppers and column stoppers corresponds to the respective number of rows and columns in the array. Single pin in FIGS. 6A-6C is shown and described herein merely to clarify the method by which array of pins is controlled.

As described above, in an embodiment of the invention, the normal state of each pin 201, when no external forces are applied and when influenced solely by resilient compression member 204, is raised or extended. Row stoppers 301 and column stoppers 401 are provided in order to selectively lock specified pins of specified rows in lowered or in intermediate states. The stoppers are designated as 'row' or 'column' in accordance with their positioning with respect to an array of pins 201, as described below. While certain techniques are described herein as being applied to row stoppers and other techniques are described as being applied to column stoppers, the techniques described with respect to row stoppers could be applied to column stoppers and vice versa.

Figure 5:
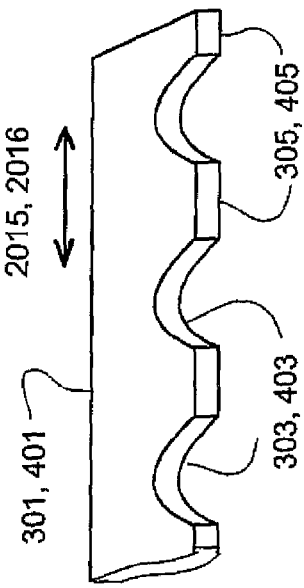
FIG. 5 is a schematic view of a stopper, employed in limiting the movement of tactile pins in accordance with some applications of the present invention.

Referring now briefly to FIG. 5 which shows a typical construction of a stopper that may be employed as either a row stopper 301 or column stopper 401 in the present embodiment of the invention. Each stopper has formed therein a plurality of cutouts 303, 403, so as to define pin stops 305, 405 therebetween. While cutouts 303, 403 are seen to have curved edges, they may also be non-curved, as long as the opening is configured to facilitate passage therethough of the engagement portion 205 of a pin 201. Similarly, the pin stops 305, 405 may have any desired shape, provided that it is configured to protrude relative to the cutouts, and thus to block passage therepast of the engagement portion 205 of a pin 201. Some of the configurations of engagement portion 205 are shown and described in conjunction with FIGS. 14-16.

As seen in FIGS. 6A-6C, row stoppers 301 and column stoppers 401 are positioned with respect to pins 201; and cutouts 303, 403 and pin stops 305, 405 are formed so as to selectively block or allow movement of the pins 201 by selective engagement with engagement portions 205. More specifically, when the stoppers 301, 401 are positioned such that their respective cutouts 303, 403 are simultaneously aligned with a pin's engagement portion 205 so that it can pass through the cutouts, then that pin is free to assume its extended position under the urging of resilient compression member 204. However, when either one of stoppers 301 or 401 is positioned such that one of its pin stops 305 or 405 is aligned at least partially across the engagement portion 205 of a pin so as to obstruct movement thereof, then that pin is not free to become extended, and is locked. Clearly, there are situations when a pin is obstructed by both of the pin stops 305 and 405, as will be appreciated from the description below.

The movement of row stoppers 301 and column stoppers 401 is depicted as axial (i.e. along or parallel to a longitudinal axis of the stopper) in the presently illustrated embodiment, and is indicated by arrows 2015 and 2016, respectively. Other types of movement are described hereinbelow with respect to other embodiments of the invention.

FIG. 6A shows both row stopper 301 and column stopper 401 in a locking or closed position with respect to pin 201. In the illustrated position, row stopper 301 prevents pin 201 from becoming raised by contacting surface 2011 of engagement portion 205. Similarly, pin stop 405 of column stopper 401 obstructs contacting surface 2012 of engagement portion 205. It is noted that to keep the pin 201 lowered it is enough if one of the two stoppers is in its locking position, whereas in order for pin 201 to be unlocked so that it may be raised, both stoppers must be opened. Pin 201 is unlocked by movement of the row stopper 301 in the direction of arrow 2015, and of column stopper 401 in the direction of arrow 2016.

As shown in FIG. 6B, in response to the aforementioned movement of both the row stopper and the column stopper so as to align their cutouts 303, 403 with engagement portion 205, compression member 204 pushes pin 201 into the raised state. It is noted that when the pin 201 is in its raised state, movements and/or positions of both row and column stoppers have no effect on the position of pin 201, although it cannot be retracted until both row and column stoppers are 'opened' so as to align their cutouts 303, 403 with engagement portion 205. At this time, movement of movable reset plate 207 in a downward direction causes the engagement thereby of top surface 2013 of engagement portion 205, thereby to push pin 201 back into the lowered or retracted state illustrated in FIG. 6C.

Thereafter, in order to hold or lock the pin in its lowered state, row stopper 301 has to be 'closed' by moving it in the direction of arrow 2017 (FIG. 6C), and/or column stopper 401 has to be 'closed' moving in the direction of arrow 2018 (FIG. 6C), such that at least one of pin stops 305 or 405 is aligned at least partially across the engagement portion 205 of a pin so as to obstruct movement thereof. Once the pin 201 is locked, as described, movable reset plate 207 can be restored or returned from the lowered position seen in FIG. 6C to its elevated position, seen in FIGS. 6A and 6B.

FIGS. 6A-6C show row and column stoppers controlling a single pin. Typically, an array of pins is controlled by a corresponding plurality of row and column stoppers, as described with reference to FIGS. 7A-8B, below.

Figure 7A:
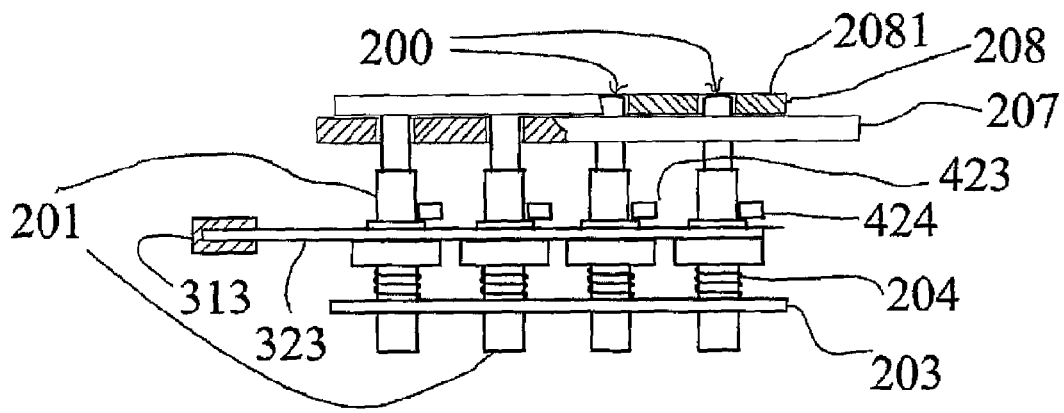
FIGS. 7A and 7B are partially cut-away side and plan views, respectively, of an array of pins in lowered states, in accordance with some applications of the present invention.
Figure 7B:
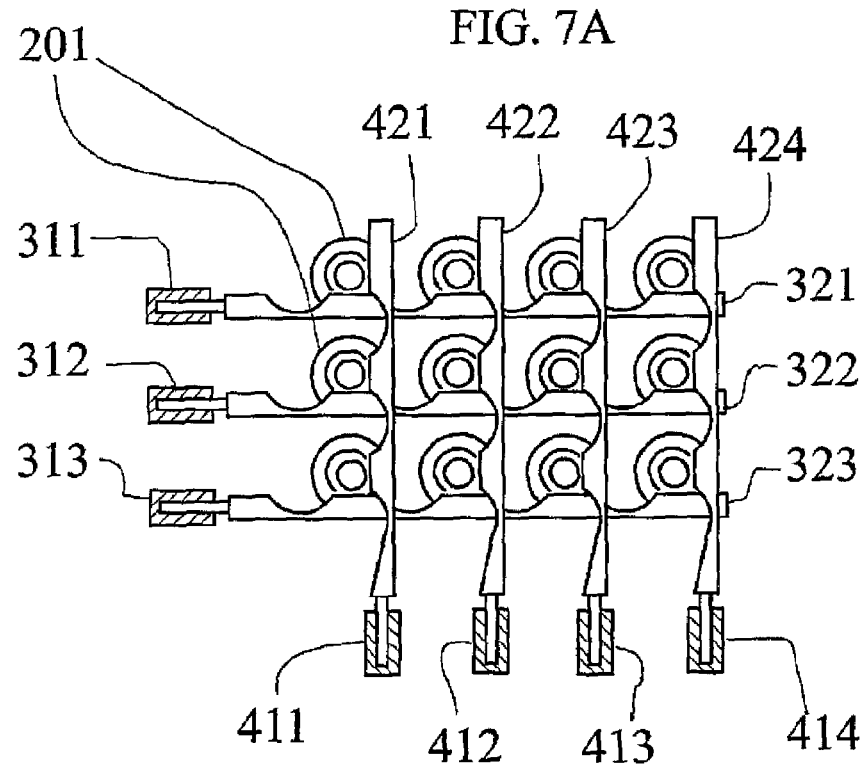

Reference is now made to FIGS. 7A-7B, which are schematic illustrations of respective views of a control mechanism for a rectangular array of pins having raised and lowered states in accordance with some applications of the present invention. The illustrated control mechanism includes a plurality of stoppers with a number of actuators required to selectively move the stoppers in and out of locking engagement with the pins, as described below.

In the present example, there is shown an array of pins having three rows and four columns. Three row stoppers 321, 322, and 323 are effective to selectively lock, first, second, and third rows of pins, respectively. The row stoppers are generally similar to the row stopper 301 described hereinabove. Actuators 311, 312 and 313 may be any suitable type of piezoelectric actuator as known in the art for use with computerized Braille Readers, or other types of actuator (e.g. magneto electric) which may be usefully employed by a person skilled in the art; and they are operative to control the movement of the row stoppers 321, 322, and 323, respectively, and are typically adapted to either push or pull the stoppers along their respective longitudinal axes. Four column stoppers 421, 422, 423, and 424 are effective to selectively lock first, second, third and fourth rows of pins, respectively. The column stoppers are generally similar to column stopper 401 described hereinabove. Actuators 411, 412, 413, and 414 control the movement of the column stoppers 421, 422, 423, and 424, respectively.

Figure 8A:
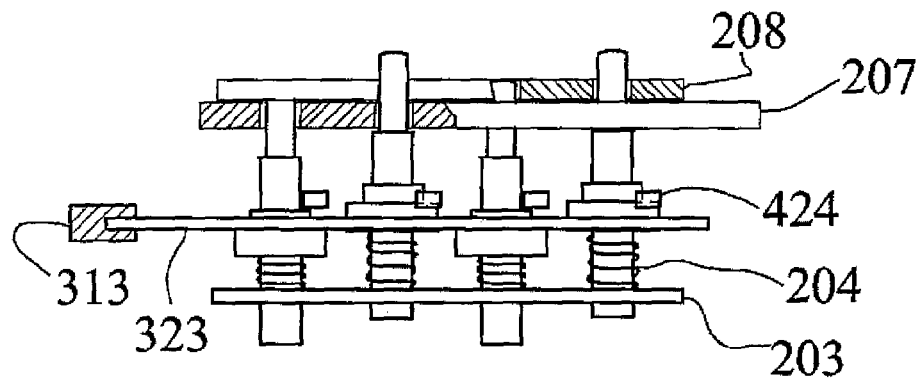
FIGS. 8A and 8B show the array of FIGS. 7A and 7B, but wherein two of the pins are in raised states.
Figure 8B:
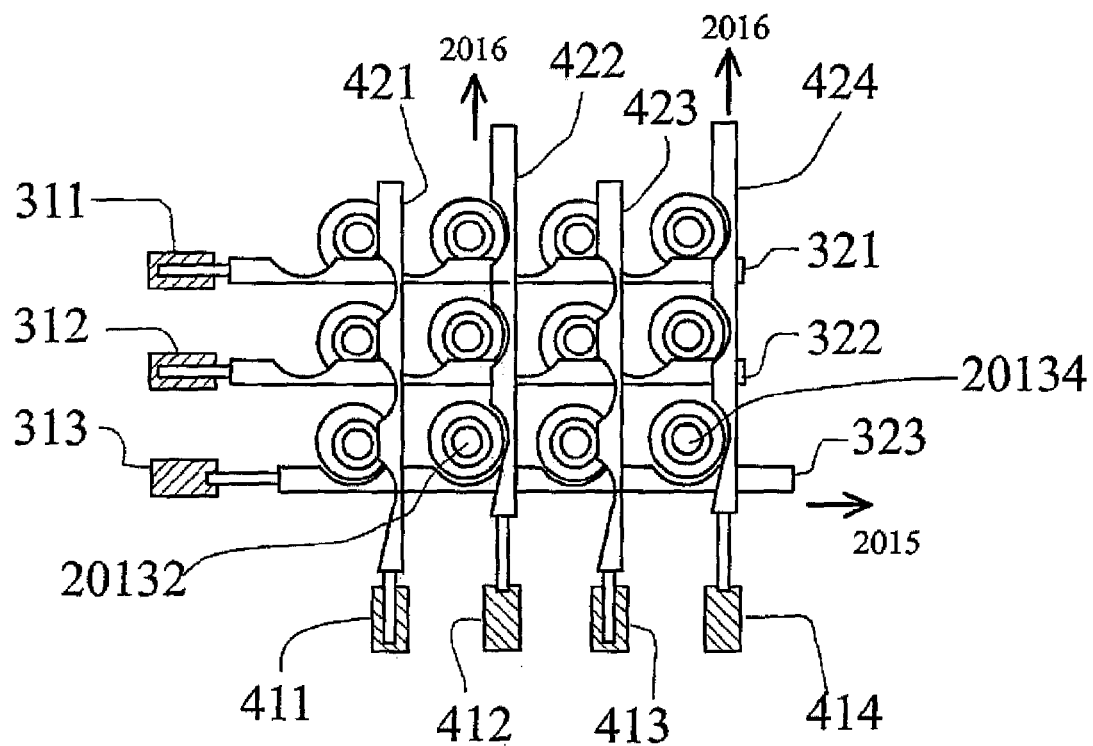

FIGS. 7A-7B show the control mechanism in an initial state in which all of the pins are lowered or retracted. Reference is now made to FIGS. 8A-8B, which are schematic illustrations of respective views of the control mechanism shown in FIGS. 7A-7B, but in which two of the pins are in raised states. As shown in FIG. 8B, pin 20132 (i.e., pin 201 in the (3, 2) position in the array) and pin 20134 (i.e., pin 201 in the (3, 4) position in the array) are in raised states. In order to release the aforementioned pins into the raised states, row stopper 323 of the third row of the array is moved in the direction of arrow 2015, as shown in FIG. 8A so as to no longer obstruct movement of the pins in that row. However, without then changing the position of any of the column stoppers 421-424, the movement of these pins remains obstructed. Accordingly, in order to release pins 20132 and 20134, both of which are no longer obstructed by row stopper 323, as described, column stoppers 422 and 424 are moved in the direction of arrows 2016, thereby releasing pins 20132 and 20134, only. Preferably, the motions of row and column stoppers releasing a required pin are simultaneous. The remaining pins (3,1) and (3,3) of row three of the array, namely the bottom row as depicted in the drawing, are prevented from moving into raised positions by respective column stoppers 411 and 413 and will remain so unless released by an appropriate movement of column stoppers 421 and 423, respectively.

In accordance with an embodiment of the invention, each row stopper and each column stopper is controlled by a single actuator; and an additional actuator is required for operation of reset plate 207. Thus, in accordance with this embodiment, the number of actuators used to control a pin array as described herein is equal to Nr+Nc+1, in which Nr is the number of rows in the array, and Nc is the number of columns in the array.

In accordance with further embodiments of the invention, one or more additional actuators may be also be used, if required. By way of example, if several reset plates 207 are provided, for example, due to the large size of the display, a corresponding plurality of additional actuators may be required.

It should be noted that in all embodiments of the present invention, the number of actuators used to control an array is less than the number of pins in the array.

Figure 10:
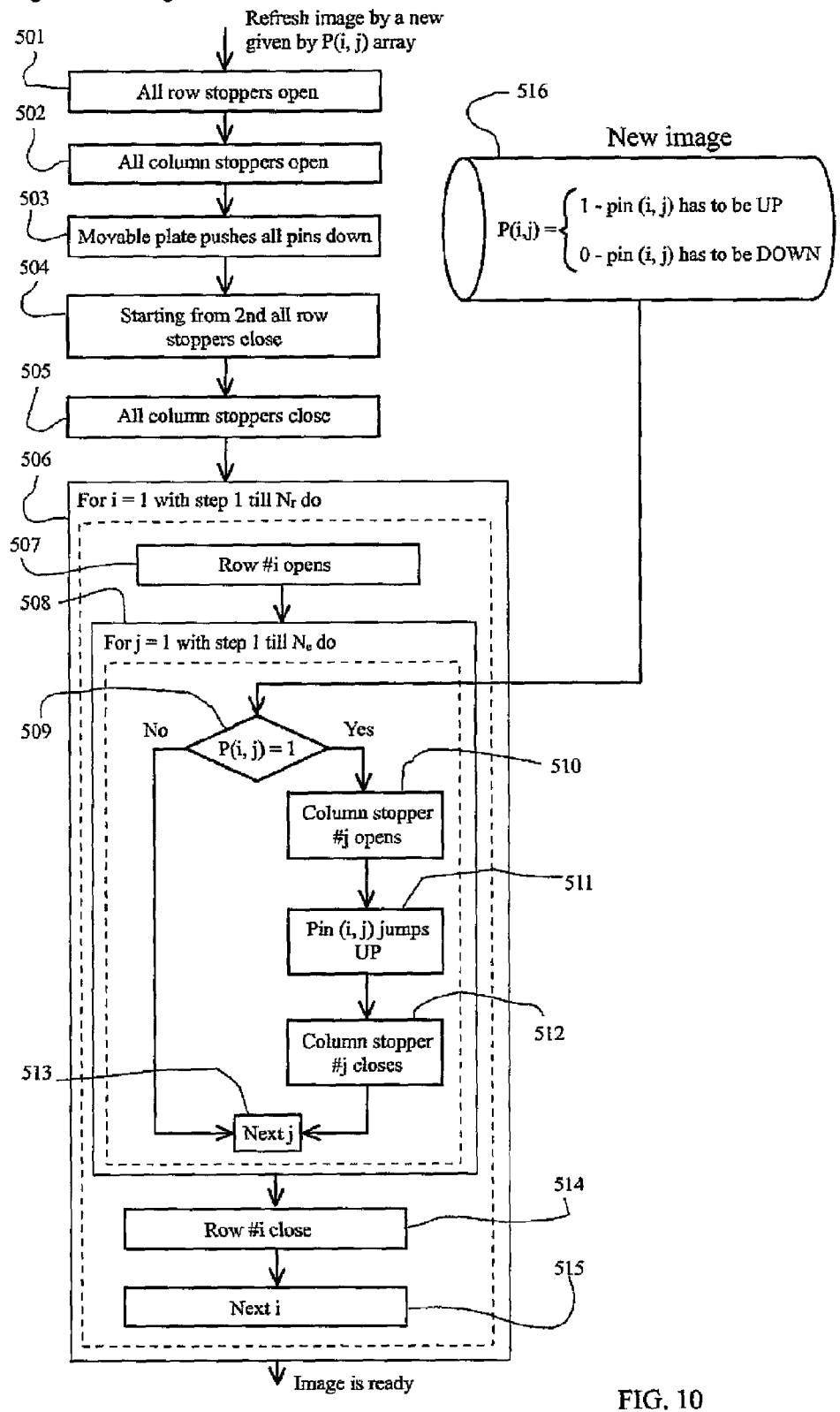
FIG. 10 is a flowchart showing an algorithm that is used to control an array of pins of a tactile display device, in accordance with some applications of the present invention.
Figure 11:
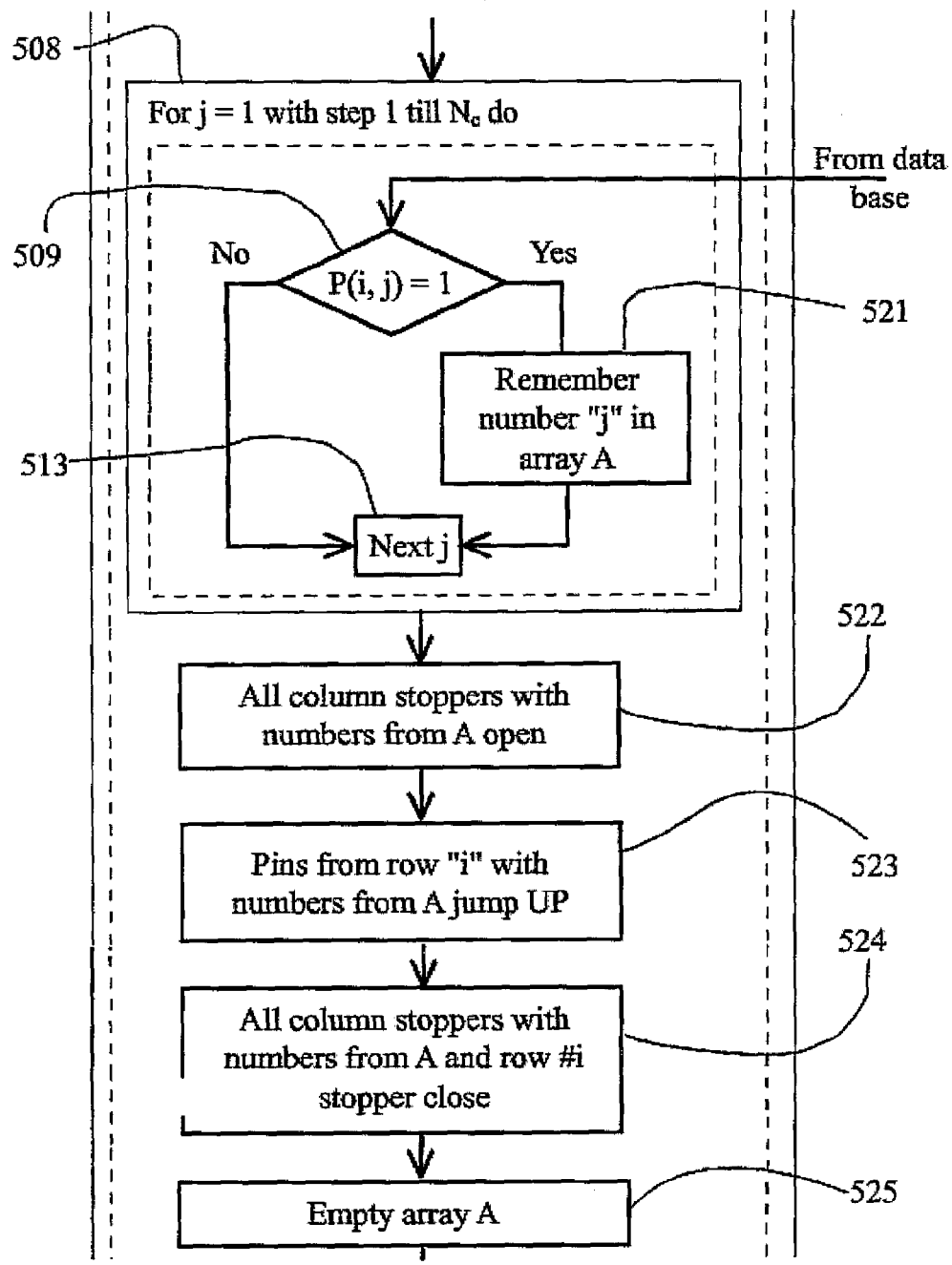
FIG. 11 is a flowchart showing steps of a time-saving algorithm modifying the algorithm of FIG. 10.
Figure 12:
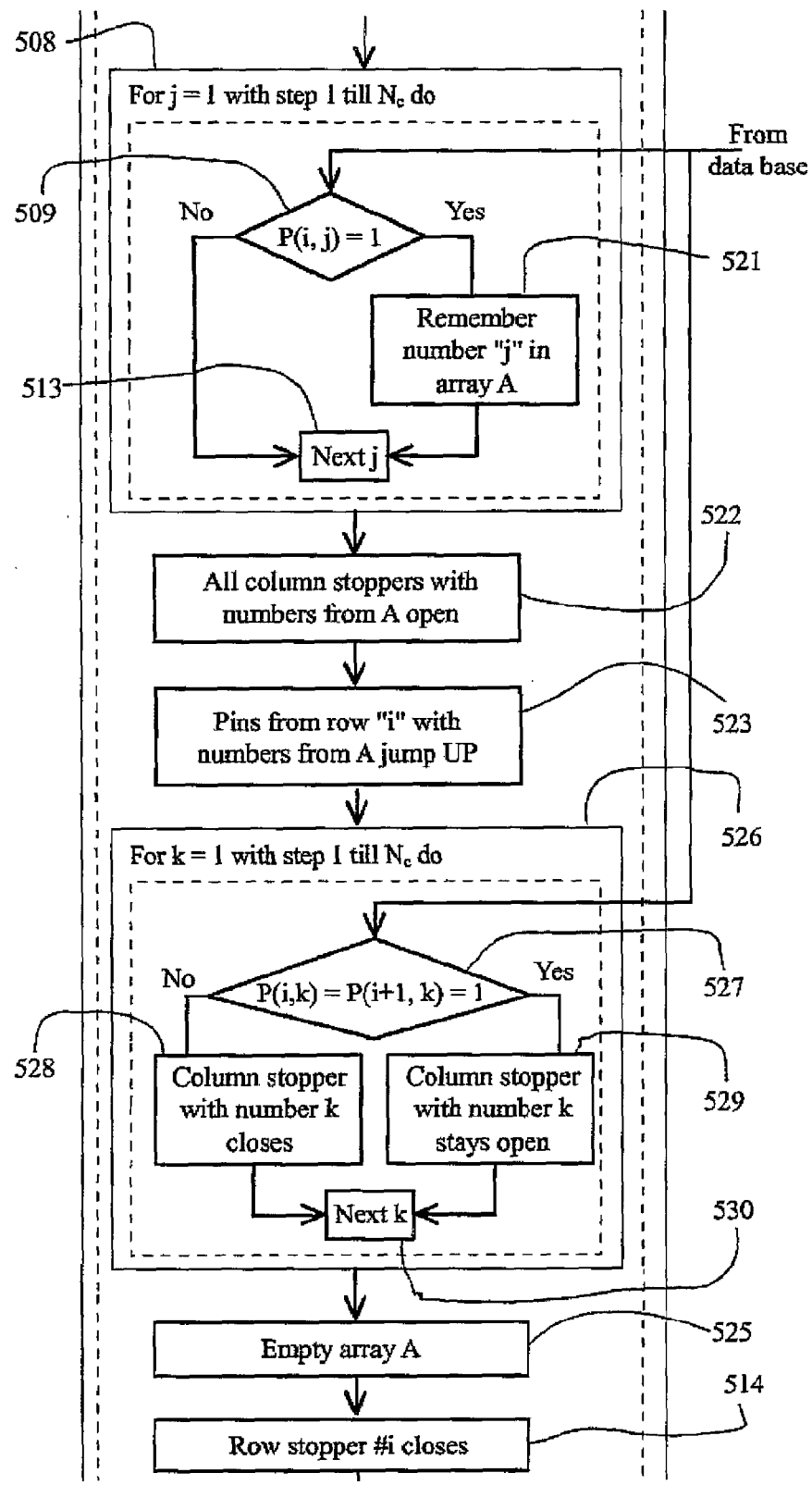
FIG. 12 is a flowchart showing steps of an energy-saving algorithm modifying the algorithms of FIGS. 10 and 11.

FIGS. 10-12 are flowcharts showing algorithms, or portions thereof, that are used to control arrays of pins of tactile devices equipped with the control mechanism described in conjunction with FIGS. 7A-8B, in accordance with some applications of the present invention.

It will be noted that the algorithms described, show successively more efficient ways of operation, both in terms of the time to refresh the image and the energy required to achieve this.

Reference is now made to FIG. 10, which is a flowchart representation of an algorithm for controlling an array 12, such as exemplified in FIGS. 1A-1D, of pins 201 of a tactile display, in accordance with an embodiment of the present invention. Array 12 has dimensions Nr*Nc, wherein Nr is the number of rows in the array and Nc is the number of columns in the array. In the flowchart it is seen that, in a starting configuration, the array displays a first image, and subsequently replaces the first image with a second image which is determined by a numerical array P(i, j) stored in a data base.

For a pin array having dimensions Nr*Nc, the numerical array P has the same dimensions and for some applications with only two possible pin states the array P is a binary array where its (i, j) element equals 1 if the pin (i, j) has to extend to a raised state and equals 0 for a pin which is to remain lowered. This could be considered to be a dichromatic image.

In order to refresh the image all the row stoppers 301 are opened in a first step 501. Subsequently, all the column stoppers 401 are opened, in step 502 In step 503, movable reset plate 207 pushes down all of the pins in the array. When all the pins are retracted, all of the row stoppers are closed (step 504), and all of the column stoppers are closed (step 505) so as to lock the entire array of pins in a lowered or retracted state, after which those pins required to form the image to be displayed will be selectively released according to the numerical array P(i, j). Preferably, all of the row and column stoppers in steps 504 and 505 are closed simultaneously.

In the sequence of operations required to refresh the image, after all of the pins have been pushed down by reset plate 207, the first action would normally be to disengage one of the row stoppers, typically of the first row in the array, and thereafter to release selected pins therein by disengagement also of specific column stoppers. Accordingly, in order to save energy and time, the row stopper of that first row does not need to be closed in step 504.

Referring again to FIG. 10, starting with the row which was not closed by its row stopper, typically the first row, and then for each subsequent row, the following steps are then applied:

For each pin j in a current row (j=1, 2, . . . , Nc), it is determined based upon the array P(i, j) whether the pin should be released (step 509). If the pin is to be released, then the column stopper corresponding to that pin is opened (step 510), such that the pin under the pressure of its resilient member 204 becomes raised (step 511). The column stopper is then closed (step 512) so as to prevent other pins in that column from being released on movement of subsequent row stoppers along that column, and step 509 is applied to the next pin in the row (step 513). If it is determined in step 509 that a pin is to remain lowered, then step 509 is applied to the next pin with no further steps in between. Once steps 509 to 513 have been applied to all of the pins in the row, the row stopper is closed (step 514). Subsequently, the next row (i=2) is opened (step 507). Steps 509 to 513 are then applied to each of the pins in the next row. The aforementioned steps are repeated for all of the rows in the array (i=3, 4, . . . , Nr) (step 515).

Reference is now made to FIG. 11, which is a flowchart showing steps of an algorithm that provides additional time savings compared to the algorithm of FIG. 10, which is used to control array 12 of pins 201 with the control mechanism described in conjunction with FIGS. 7A-8B. Typically, the algorithm described with reference to FIG. 11 is time-saving relative to that of FIG. 10, since in the algorithm described with reference to FIG. 11, for a given row, all of the column stoppers that are to be opened are opened in parallel or simultaneously, as opposed to being opened in sequence, as they are in the algorithm described with reference to FIG. 10.

Steps 501 to 505 of the algorithm are generally similar to those described with reference to FIG. 10. Thus, starting with an array that is showing an image, in first step 501 all the row stoppers 301 are opened. Subsequently, all the column stoppers 401 are opened, in step 502. In step 503, movable reset plate 207 pushes down all of the pins in the array. At this stage, all of the row stoppers, except for one of the row stoppers (e.g., that of the first row (i=1)), are closed (step 504), and all of the column stoppers are closed (step 505).

Subsequently, referring now to FIG. 11, in steps 509, 521 and 513, for the first row, it is determined whether there are pins that are to be raised, and the column numbers corresponding to these pins are stored in a one dimensional array A. In step 522, all of the column stoppers of columns having pins within the first row that are to be raised, are opened. As a result, all of the first row pins to be raised are raised simultaneously (step 523). All of the open column stoppers and the row stopper of the first row then close (step 524), and array A of the system's memory is emptied (step 525). Subsequently, the next row stopper (i=2) is opened, and steps 509 to 525 are applied to the pins of the next row. The aforementioned steps are applied to each of the remaining rows (i=3, 4, . . . , Nr) of the array, in sequence.

Reference is now made to FIG. 12, which is a flowchart showing steps of an algorithm that provides additional energy savings compared to the algorithm of FIG. 11, which is used to control array 12 of pins 201 with the control mechanism described in conjunction with FIGS. 7A-8B. Typically, the algorithm described with reference to FIG. 12 is energy-saving relative to those of FIGS. 10 and 11, since in the algorithm described with reference to FIG. 12, if in a given column, the pins of two adjacent rows are to be raised, the column stopper does not open and close, in the transition between the adjacent rows, as it would in the algorithm described with reference to FIGS. 10 and 11.

Steps 501 to 505 of the algorithm are generally similar to those described with reference to FIG. 10. Thus, starting with an array that is showing an image, in first step 501 all the row stoppers 301 are opened. Subsequently, all the column stoppers 401 are opened, in step 502. In step 503, movable reset plate 207 pushes down all of the pins in the array. At this stage, all of the row stoppers, except for that of one of the rows (e.g., that of the first row (i=1)), are closed (step 504), and all of the column stoppers are closed (step 505).

Subsequently, generally similar steps to those described with reference to FIG. 11 are applied to the array. Thus, in steps 509, 521 and 513, for the first row, it is determined whether there are pins that are to be raised, and the column numbers corresponding to these pins are stored in one dimensional array A. In step 522, all of the column stoppers of columns having pins within the first row that are to be raised, are opened. As a result, all of the pins of the first row that are to be raised become raised simultaneously (step 523).

In step 527 to 530, it is determined for which of the raised pins in the first row, the pin in the same column of the next row should also be raised (i.e., P(i,k)=P(i+1,k)=1), where P(i,k)=1 means that the pin in the (i,k) position should be raised) (step 527). The column stoppers corresponding to these pins are left open (step 529), so as to facilitate the opening of the pins of those columns of the next row. Column stoppers which are presently open, but which correspond to pins in the next row that are not to be raised, are closed.

Subsequently, array A of the system's memory is emptied (step 525). Subsequently, the next row stopper (i=2) is opened and the steps described with reference to the first row are applied to the second row, and then to each of the rows of the array in sequence. It is noted that from the second row onwards, for some of the pins that are to be raised, it is not necessary to open the column stopper of that pins, since the column stopper remains open from when the corresponding pin in the previous row was raised.

The above algorithms can be further improved so as to result in additional time and energy savings, by including the step of checking the necessity of operating a row stopper before refreshing the display. More specifically, when all operations for a row number K have been finished (step 514 in FIG. 10), there has to be provided a verification of the row number K+1 of the array P(i, j)—i.e. elements of its K+1 row for the existence of non zero elements. If there is at least one such element, the row number K+1 has to be opened; otherwise, the actuator of the row K+1 need not be operated. This procedure may then be repeated for the subsequent rows number K+2, number K+3 and so on.

It is noted with respect to the algorithms described with reference to FIGS. 10-12 and their modifications that, as in general in the present application, although certain steps have been described as being applied to row stoppers and other steps have been described as being applied to column stoppers, these steps are interchangeable. Thus, steps described with respect to row stoppers could be applied to column stoppers and vice versa.

Reference is now made to FIG. 13 by way of exemplification of the algorithms described in conjunction with FIGS. 10-12. References to operating elements are to those shown in FIGS. 7A-8B. FIGS. 7A-8B depict 3*4 tactile displays, and FIG. 13 is an example of a tactile image produced by a 3*4 tactile display. Some of its pins are raised, namely (1,1), (1,3) (1,4), (2,2), (2,3), (3,3), and (3,4). The raised pins are represented by black filled circles and the remaining, lowered pins, by blank circles.

Using the algorithm described above with reference to FIG. 10, the following steps are performed:

All row stoppers 311-313 and column stoppers 411-413 are opened.

Moveable reset plate 207 pushes all pins down.

Row stoppers 312 and 313 only, and column stoppers 411-413 are closed. Row stopper 311 typically remains open in order to save energy, as described above.

Column 1 stopper is opened, resulting in pin (1,1) becoming raised.

Column 1 stopper is closed.

Column 3 stopper is opened, resulting in pin (1,3) becoming raised.
Column 3 stopper is closed.
Column 4 stopper is opened, resulting in pin (1,4) becoming raised.
Row 1 stopper and column 4 stopper are closed.
Row 2 stopper is opened.
Column 2 stopper is opened, resulting in pin (2,2) becoming raised.
Column 2 stopper is closed.
Column 3 stopper is opened, resulting in pin (2,3) becoming raised.
Row 2 stopper and column 3 stopper are closed.
Row 3 stopper is opened.
Column 3 stopper is opened, resulting in pin (3,3) becoming raised.
Column 3 stopper is closed.
Column 4 stopper is opened, resulting in pin (3,4) becoming raised.
Row 3 stopper and column 4 stopper are closed.

Thus, in total, using the algorithm shown in FIG. 10, 19 consecutive operations are performed, leading to 33 movements of stoppers.

Using the time-saving algorithm described with reference to FIG. 11, the following steps are performed:
All row stoppers 301 and column stoppers 401 are opened.
Moveable reset plate 207 pushes all pins down.
Row 2 stopper and row 3 stopper and all column stoppers are closed.
Column stoppers 1, 3 and 4 are opened, resulting in pins (1,1), (1,3), and (1,4) becoming raised.
Row 1 stopper and column stoppers 1, 3, and 4 are closed.
Row 2 stopper is opened.
Column stoppers 2 and 3 are opened, resulting in pins (2,2) and (2,3) becoming raised.
Row 2 stopper and column stoppers 2 and 3 are closed.
Row 3 stopper is opened.
Column 3 and 4 stoppers are opened, resulting in pins (3,3) and (3,4) becoming raised.
Row stopper 3 and column stoppers 3 and 4 are closed.

Thus, in total, using the algorithm shown in FIG. 11, 11 consecutive operations are performed and there are 33 movements of stoppers. Thus, using the algorithm shown in FIG. 11 results in fewer operations being performed, than the 19 performed using the algorithm shown in FIG. 10, in order to generate the same tactile image.

Using the energy-saving algorithm described with reference to FIG. 12, the following steps are performed:
All row stoppers 301 and column stoppers 401 are opened.
Moveable reset plate 207 pushes all pins down.
Row 2 stopper and row 3 stopper and all column stoppers are closed.
Column stoppers 1, 3 and 4 are opened, resulting in pins (1,1), (1,3), and (1,4) becoming raised.
Row 1 stopper and column stoppers 1 and 3 are closed.
Row stopper 2 is opened, resulting in pin (2,3) becoming raised, since column 3 stopper is already open.
Column 2 stopper is opened, resulting in pin (2,2) becoming raised.
Row 2 stopper and column 2 stopper are closed.
Row 3 stopper is opened, resulting in pin (3,3) becoming raised, since column 3 stopper is already open.
Column 4 stopper is opened, resulting in pin (3,4) becoming raised.
Row 3 stopper and column stoppers 3 and 4 are closed.

Thus, using the algorithm shown in FIG. 12, 11 consecutive operations are performed and there are 28 movements of stoppers. Thus, using the algorithm shown in FIG. 12 results in fewer movements of stoppers, than the 33 performed using the algorithms shown in FIGS. 10 and 11, in order to generate the same tactile image.

From the above description of algorithms, it will be appreciated that the operation of the tactile display herein can be improved so as to save both energy and time. The following table summarizes the respective contributions of the above-described algorithms as they apply to a 3*4 array. It will also be appreciated that the time and energy savings will be even more noticeable for much larger displays constructed and operative in accordance with the various embodiments of the present invention.

|  | Number of Steps | Number of Actions | Cumulative Advantage |
| --- | --- | --- | --- |
| FIG. 10 Algorithm | 19 | 33 | Energy saving |
| FIG. 11 Algorithm | 11 | 33 | Additional time saving |
| FIG. 12 Algorithm | 11 | 29 | Additional energy saving |

There now follows a description of the construction and operation of several examples of row stoppers. These examples demonstrate a variety of different constructions and ways of operations of row stoppers, but they are intended to be non-limiting examples only, and other constructions and methods of operation are also covered by this invention. It will also be appreciated that although the following description is provided with reference to a row stopper, it may also be applied to the construction and operation of column stoppers.

In accordance with an embodiment of the invention, the present invention provides a tactile display with a high pin density. By way of non-limiting illustrative example, a standard Braille display has an average spacing of 2.4 mm, whereas a tactile display formed in accordance with the present invention may be less than this, for example, 1.2 mm and even smaller. 1.2 mm is close to an optimal spacing for graphical tactile displays which are intended also for output simultaneously both of text in Braille code and of tactile images with a resolution which is high enough to show small graphical features, but still within the limits of finger tips tactile sensibility. Stopper and pin configurations and arrangements which facilitate high density displays are described, inter alia, hereinbelow in conjunction with FIGS. 14A-16D.

Reference is now made to FIGS. 14A-14B, which are schematic illustrations of a pivotable row stopper 3223, in accordance with an embodiment of the present invention. Row stopper 3223 is generally similar to the row stoppers described hereinabove, except that it pivots about its longitudinal axis, as indicated by arrow 3233, as opposed to moving along its axis. Row stopper 3223 has pin stops 3305 which function generally similarly to pin stops 305 and 405 described above, inter alia, in conjunction with FIG. 5, and are therefore, not described again herein, specifically.

Referring now also to FIGS. 14C and 14D, it is seen that pin stops 3305 selectively engage surfaces 2011 of engagement portions 205 of the pins 201, in response to a pivoting of the row stopper 3223 by actuator 3123.

A particular advantage of the present embodiment in which row stopper 3223 is actuated by pivoting, is that it facilities the positioning of two adjacent pin arrays at a closer distance than is possible with sliding stoppers as shown and described above. In other words, a space saving inherent in the present embodiments is in a dimension, perpendicular to the direction in which the row stopper shifts in the previous embodiment of the invention, as shown in the drawings.

Reference is now made to FIGS. 15A-15B, which are schematic illustrations of a space-saving row stopper 3224 for facilitating dense packing of pins 201, in accordance with an embodiment of the present invention. In the illustrated embodiment, adjacent rows of pins are packed more tightly in the illustrated x direction, so as to increase the number of pins that can be controlled by a single actuator 3124. Essentially, each stopper, in the present embodiment, is used to control two parallel, offset rows of pins. As seen, a single row stopper 3224 has short pin stops 3134 of length L1 (FIG. 15C) for locking the row of pins closer to row stopper 3224; and long pin stops 3135 of length L2 (FIG. 15C) for locking the row of pins further away from row stopper 3224, L1 being less than L2.

Reference is now made to FIGS. 16A-16D, which are schematic illustrations of arrangements of arrays of pins 201 facilitating yet a further decrease between neighboring pins, thereby to further increase the pin density, in accordance with a further embodiment of the present invention.

Figure 16A:
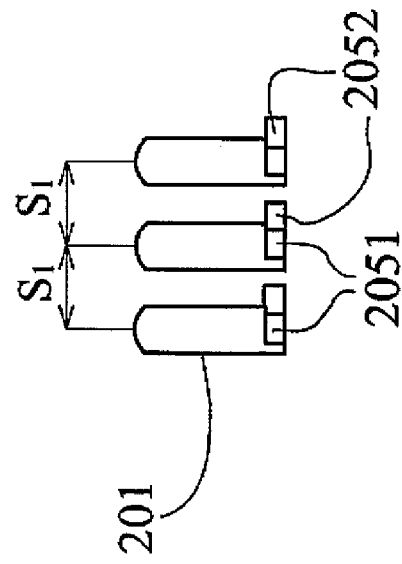
FIGS. 16A-D are schematic illustrations of arrangements of pins and stoppers facilitating a relatively more dense packing of the illustrated pins, in accordance with some applications of the present invention.
Figure 16C:
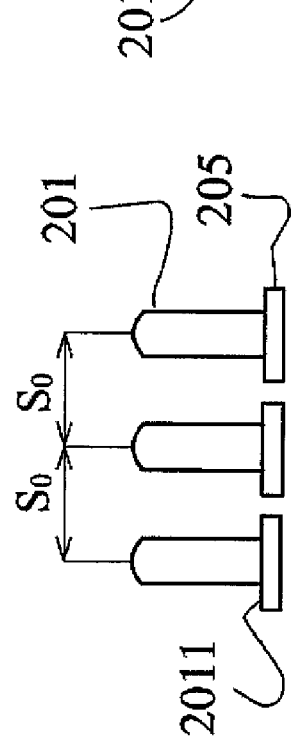
Figure 16B:
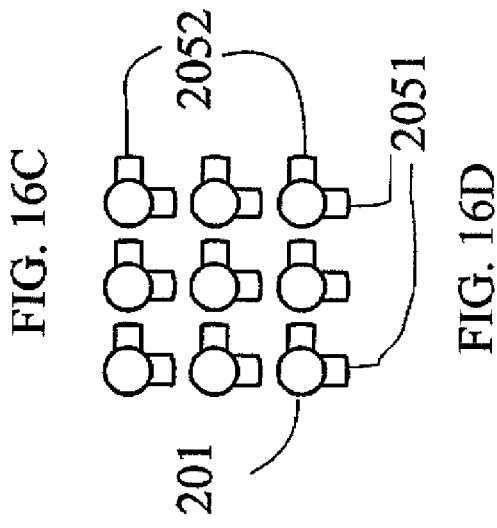

In FIGS. 16A-16B there is shown an array 12 of pins 201, the pins having a pin construction in which engagement portion 205 is a circumferential ring extending along the circumference of the pin. The diameter of this engagement portion 205 determines a minimum distance $S_0$ between centers of neighboring pins which must be big enough to accommodate the radial protrusion of the engagement portion 205 as well as a space 410 between the pins to accommodate the column or row stoppers.

Figure 16D:
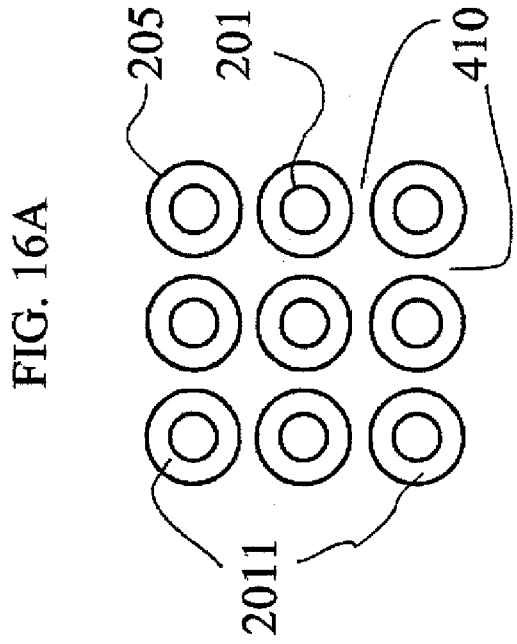

FIGS. 16C-16D show an array of pins that are similar to those of the array of FIGS. 16A-16B but wherein the engagement portion 205 of each pin is formed as a pair of non-coaxial first and second protrusions 2051 and 2052. Protrusions 2051 and 2052 extend radially from the pin at an angular spacing of approximately 90 degrees as for example shown in FIG. 16C. First protrusion 2051 is, in the present example, configured for engagement by a row stopper (not shown), and second protrusion 2052 is configured for engagement by a column stopper (not shown). It is noted that the provision of engagement portion 205 as protrusions, as shown, requires a significantly smaller space than that required for the arrangement shown in FIGS. 16A-16B such that $S_1$ (FIG. 16C) can be significantly less than $S_0$ (FIG. 16A), thereby facilitating an increased pin density in a display.

Although pin constructions and stoppers are shown having specific configurations, the scope of the present invention includes using pin constructions and stoppers that operate generally in accordance with the techniques described herein, but having different configurations to the specific configurations described herein, which would occur to persons skilled in the art upon reading the present application.

There follows a description of arrangements of control mechanisms that typically allows the control of an array of pins using an even smaller number of actuators than are used in the configurations shown and described hereinabove.

Reference is now made to FIGS. 17A-18B, which show a control mechanism constructed and operative in accordance with an alternative embodiment of the present invention. As opposed to the mechanism shown and described in conjunction with FIGS. 7A-8B, the mechanism shown in FIGS. 17A-18B uses only two actuators for a group of row and/or column stoppers, rather than requiring a single actuator for each stopper. While the illustrated implementation is with a 3*4 pin array, it will be appreciated that it may be implemented with respect to substantially any size of array.

Figure 17A:
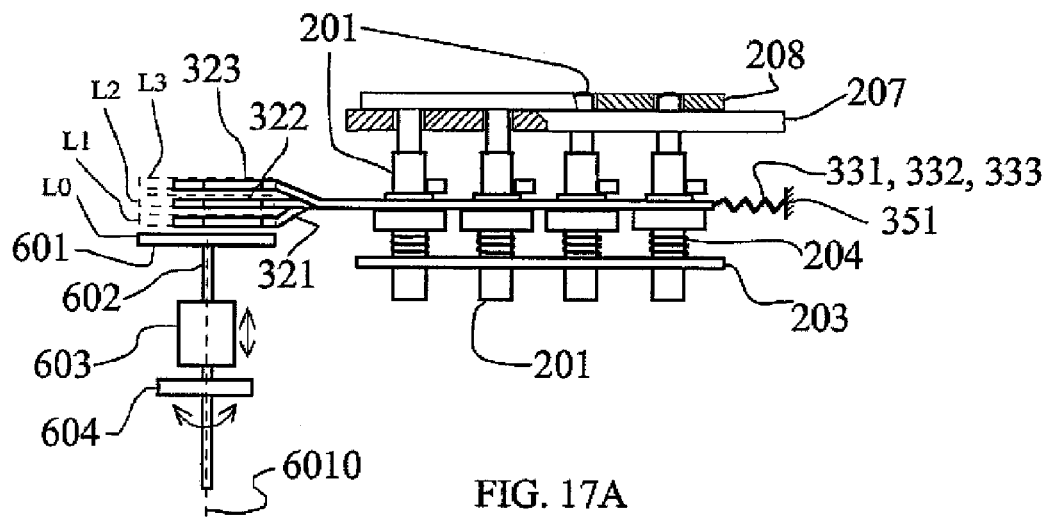
FIGS. 17A and 17B are partially cut-away side and plan views, respectively, of a portion of a tactile display employing two actuators for controlling a plurality of rows of pins, in accordance with an embodiment of the present invention.
Figure 17B:
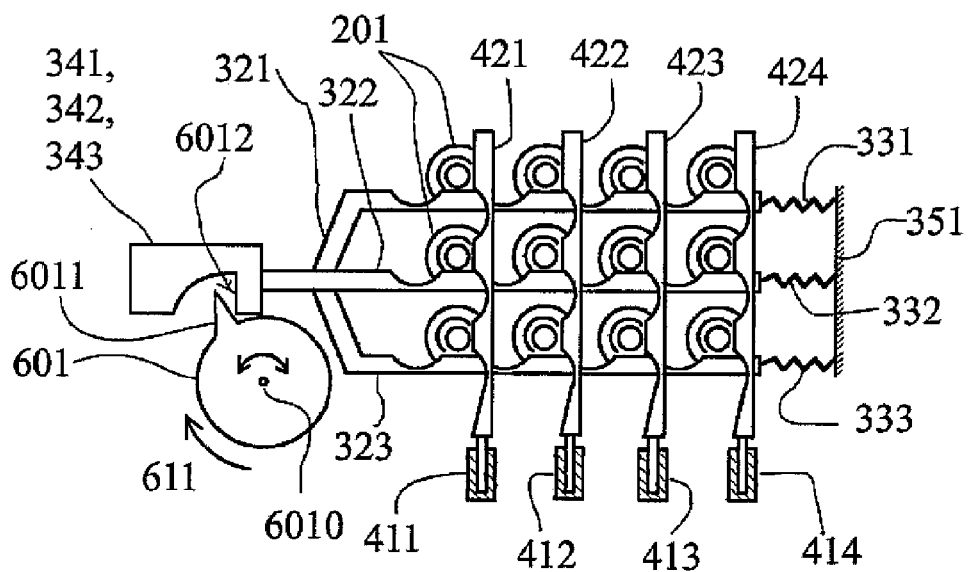

Referring now initially to FIGS. 17A and 17B, in the illustrated 3*4 array, there are shown four column stoppers 421-424 and their respective actuators 411-414, and three row stoppers 321-323; the three row stoppers being operated by means of only two actuators 603 and 604, as described hereinbelow. While the column actuators 411-414 could also be replaced by a pair of actuators such as the row actuators 603 and 604, and is within the scope of the present invention, this embodiment is not illustrated herein, merely for purposes of simplicity. While the present example has specific actuators being used for specific numbers of stoppers, it will be appreciated that any of the exemplified actuators may be used for substantially any number of stoppers.

Accordingly, as seen in the drawings, each row stopper terminates in a cam follower at a proximal end, illustrated as the left end in the drawing. The cam followers are, respectively referenced 341, 342 and 343, arranged in the present example, one above the other, via which an axial opening or closing motion is applied to the row stoppers. There is further provided an actuator couple, typically arranged along an axis 6010, and including an alternating pivot actuator 604 and a step actuator 603 coaxially mounted onto pivot actuator 604, best seen in FIG. 17A. An axle 602 extends along axis 6010 between step actuator 603 and a cam 601. Cam 601 has a cam tooth 6011 which is adapted to selectively engage one of the cam followers 341, 342 or 343 depending on the its height relative thereto, which is determined by appropriate motion of step actuator 603 so as to extend or retract axle 602 in relation to the cam followers.

As seen in FIG. 17B, in accordance with the present example, cam followers 341, 342, 343 are configured so as to facilitate passage therethrough of cam tooth 6011 as it is positioned in registration with a cam surface 6012 of one of the cam followers 341, 342, 342 of the row stoppers. Pivot actuator 604 is operative to pivot so as to rotate cam 601 and thus bring cam tooth 6011 into pushing engagement with cam surface 6012 of a selected cam follower 341, 342 or 343, thereby to cause an axial movement of the selected cam follower away from axis 6010 and towards a fixed base 351 adjacent to a distal or right hand end of the stoppers 321, 322, 333. Each row stopper is connected to base 351 by a resilient compression member 331, 332, 333, respectively, which is compressed by the axial movement of its associated row stopper, and which is operative to return the row stopper to its original position once the cam is disengaged therefrom.

Referring again to FIGS. 17A-17B, these drawings show the control mechanism in its starting state when all of the pins are lowered and all row and column stoppers are closed. Cam 601 is shown at its lowest level L0 and is not engaged with any of the cam followers. The row stoppers 321, 322, 323 are held in their 'closed' states by respective compression members 331, 332 and 333.

In the present example, cam 601 can be raised to respective levels L1, L2, L3, etc., by step actuator 603. Initially, when the cam 601 is at level L0, it cannot interact with any row stopper. Therefore, the cam being rotated by actuator 604 has no effect on the row stoppers. Once it reaches level L1, L2 or L3 by appropriate operation of step actuator 603 the cam can become engaged with a corresponding one of the cam followers 341, 342 or 343 and thus with the corresponding row stopper 321, 322 or 323. However, the row stopper will only move so as to release the pins in that row upon appropriate operation of pivot actuator 604.

In response to the cam being raised to one of the levels L1, L2 or L3 by step actuator 603 and then being rotated by rotator 604 in the direction indicated by arrow 611 (FIG. 17B), the corresponding row stopper 321, 322 or 323 is opened and a corresponding compression member 331, 332 or 333 is compressed. As with previous embodiments of the invention, even when the a row stopper is open, a pin from that row will move to a raised state only if also released by a corresponding column stopper.

In order to close the row stoppers, for example row stopper 321, the cam 601 has to be rotated by rotator 604 in the direction opposite to that indicated by arrow 611 or it has to be shifted from its present level by step actuator 603, thereby allowing compression member 331 to return the row stopper to its locking location.

Figure 18A:
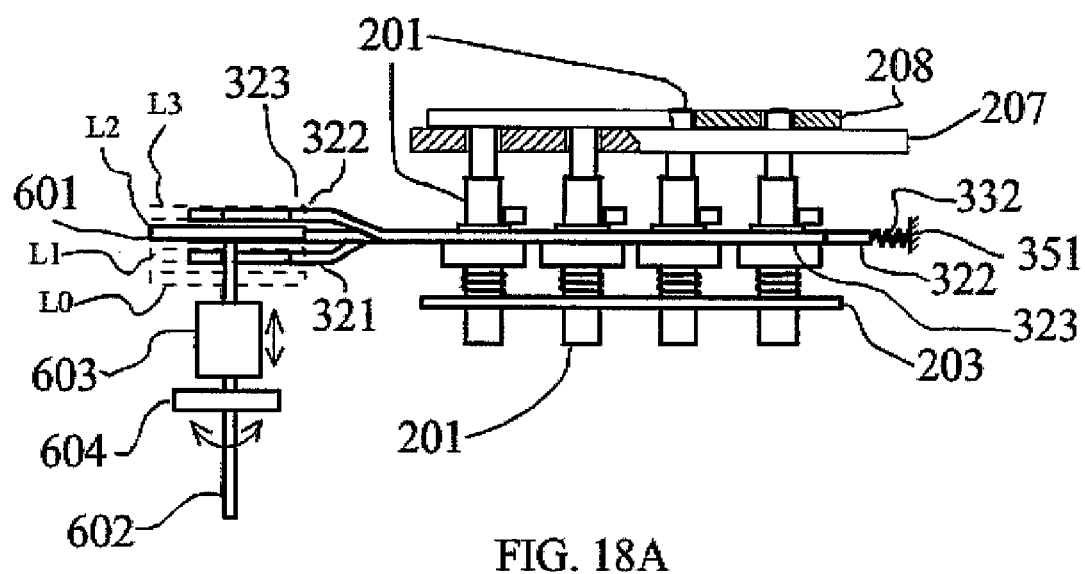
FIGS. 18A and 18B show the array of FIGS. 17A and 17B, but wherein two of the pins are in raised states.
Figure 18B:
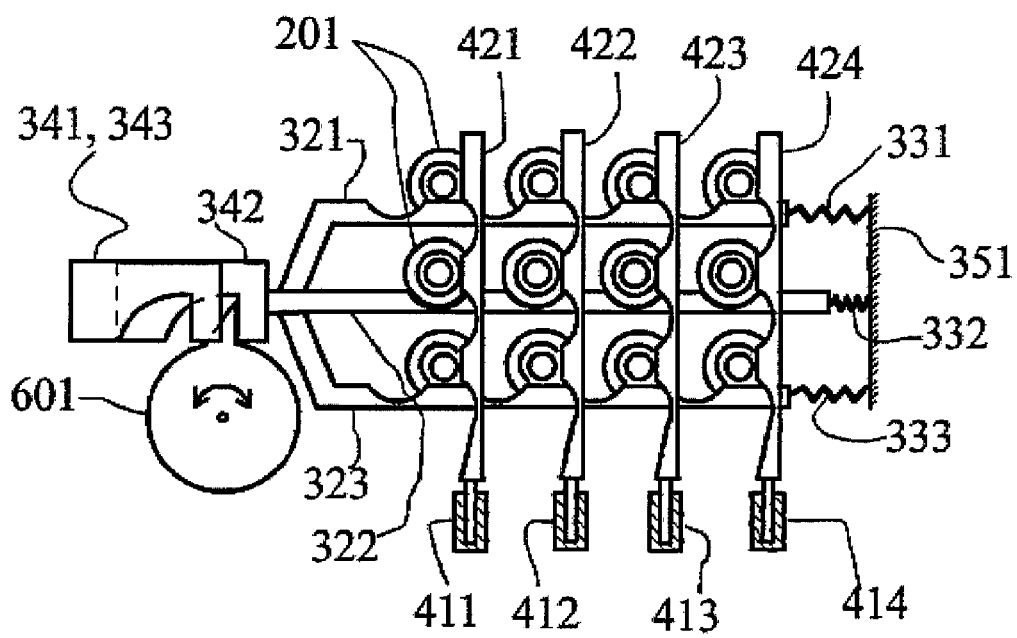

To demonstrate an operation of the control mechanism described in conjunction with FIGS. 17A-17B, FIGS. 18A-18B show the mechanism in a state in which actuator 604 is seen to be moving second row stopper 322 into an open position. As shown in FIG. 18A, the cam 601 has been raised to level L2, such that it engages cam follower 342, which is coupled to second row stopper 322. When the cam is disposed on level L2, rotator actuator 604 has rotated cam 601 in the direction indicated by arrow 611, such that second row stopper is pushed open. As a result of second row stopper having been pushed, compression member 332 becomes compressed. Therefore, when cam 601 is subsequently rotated in opposite and/or is moved to a different level, the compression member 332 pushes back the second row stopper into its locking location.

It is noted that, although FIGS. 17A-18B show a configuration in which the row stoppers:
(a) are opened by cam 601 rotating clockwise and pushing the row stopper in a first direction, thereby causing a compression member to become compressed, and
(b) are closed by the compressed compression member pushing the row stopper in the opposite direction to the first direction, different configurations may be used in accordance with different embodiments of the invention.

For example, a configuration may be used in which the row stoppers
(a) are opened by cam 601 rotating counterclockwise and pulling the row stopper in a first direction, thereby tensioning a resilient tensile member, and
(b) are closed by the tensile member pulling the row stopper in the opposite direction to the first direction.

It is noted that the mechanism described with reference to FIGS. 17A-18B for using a single actuator of a set of two actuators for controlling a plurality of row stoppers, may also be used for controlling a plurality of column stoppers. Thus, a single set of two actuators may be used for controlling three or more column stoppers.

Figure 19:
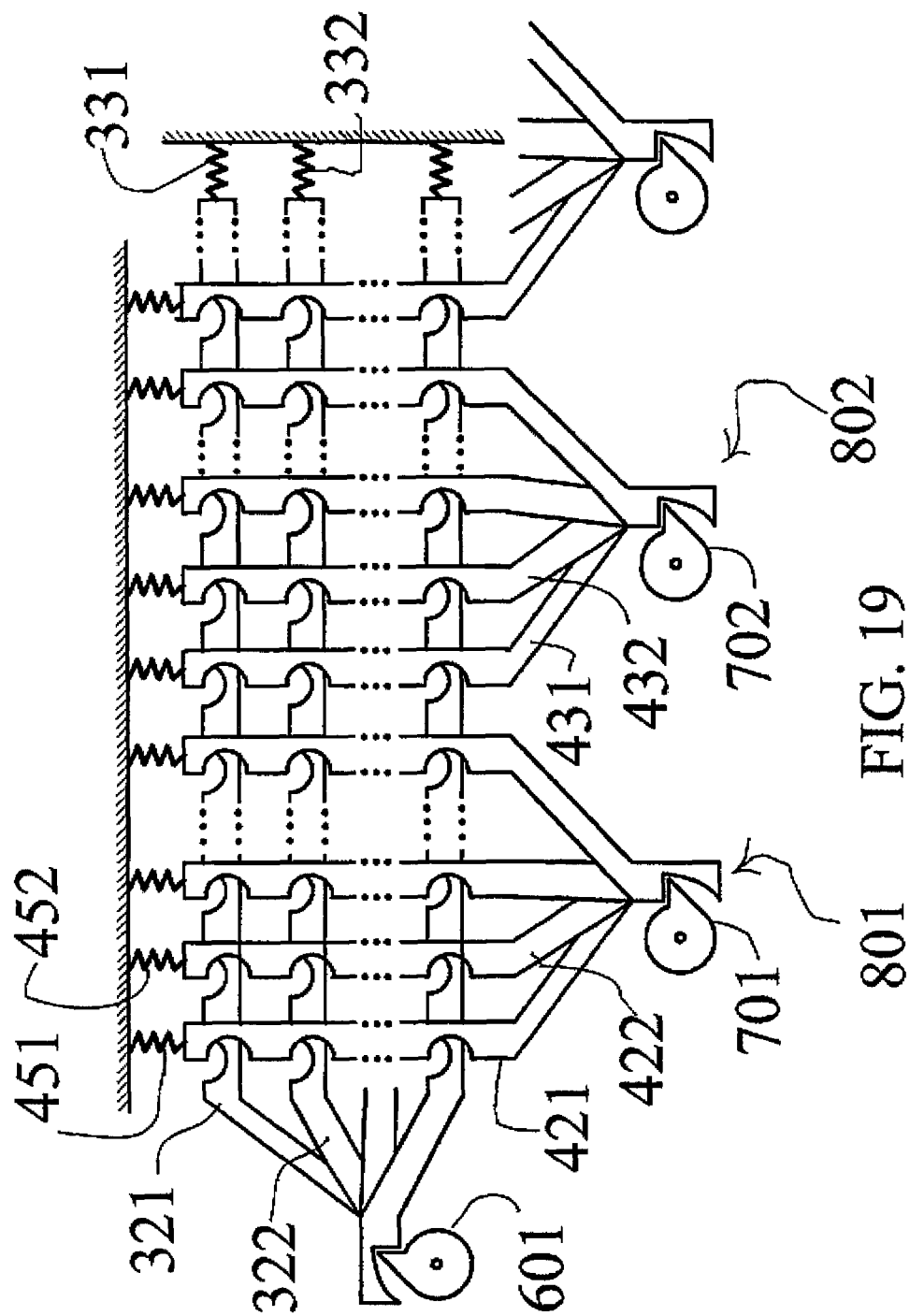
FIG. 19 shows a portion of a tactile display employing a plurality of paired sets of actuators, each for controlling a predetermined set of row or column stoppers, in accordance with an embodiment of the present invention.

It is further noted that in other embodiments of the invention, if (a) a mechanism as described with reference to FIGS. 17A-18B is used to control all of the row stoppers of an array of pins, and (b) a mechanism as described with reference to FIGS. 17A-18B is used to control all of the column stoppers of an array of pins, then the timesaving and energy-saving algorithms for controlling the array of pins, as described with reference to FIGS. 10-12 cannot be used. This is because the mechanism described in FIGS. 17A-18B, if used to control row stoppers, can only control one row stopper at a time, and, if used to control column stoppers, can only control one column stopper at a time. However, the algorithms described with reference to FIGS. 10-12 include the step of opening several column stoppers, or several row stoppers simultaneously. For some applications, configurations are used in which single actuators control, respectively, a plurality of row stoppers and a plurality of column stoppers, and algorithms that are generally similar to those described with reference to FIGS. 11 and 12 can be used. Such configurations are described with reference to FIG. 19, for example, which follows:

Reference is now made to FIG. 19, which is a schematic illustration of sets of two actuators being used to control respective sets of column stoppers, in accordance with embodiments of the present invention. In the configuration shown in FIG. 19, a plurality of row stoppers 321, 322, etc., is controlled by a set of two actuators 603 and 604, as described hereinabove, with reference to FIGS. 17A-18B. A first set 801 of column stoppers 421, 422, etc., is controlled by a first column cam 701 which is controlled by a first column set of two actuators (not shown) including a step actuator and a rotator. A second set 802 of column stoppers 431, 432, etc., is moved by a second column cam 702 which is controlled by a second column set of two actuators (not shown) including a step actuator and a rotator. The cams 701 and 702, and the step actuators and the rotators are similar to cam 601, step actuator 603 and rotator 604, respectively, shown and described above in conjunction with FIGS. 17A-18B. Their operation is, likewise, generally similar to that described above in conjunction with FIGS. 17A-18B, and thus is not described again herein, specifically.

A plurality of column cams can be controlled simultaneously, in parallel. In general, if the total time to refresh an image when each of the column stoppers is controlled separately equals T, then using the apparatus described with reference to FIG. 19, the total time to refresh an image will typically be T/Ng, where Ng is the number of sets of column stoppers.

It is noted that a generally similar configuration to that shown in FIG. 19 may be used, but in which there are a plurality of sets of two actuators for controlling respective sets of row stoppers. Such a configuration may be used together with a plurality of sets of two actuators for controlling respective sets of column stoppers, or with a single set of two actuators for controlling all of the column stoppers.

In accordance with an embodiment of the invention, the configuration shown in FIG. 19 may be used to control a device such as a refreshable Braille display as shown in FIG. 1A, which typically includes a plurality of arrays of pins, which, in combination, define many columns of pins, but fewer rows of pins. By way of example, such a Braille display may be an array of 40 or more columns by three or four rows.

As stated hereinabove, the techniques described with reference to FIGS. 6A-19 are typically used to control pins that have raised and lowered states and that do not have intermediate states, so that they may represent dichromatic images.

In summary, for tactile devices with two pin positions the following advantages are among those that are inherent in the above-described embodiments which save energy:
1. Due to the provision and application of the resilient compression members 204, the present invention does not waste energy in supporting an image formed of raised and/or lowered pins, as opposed tactile displays using piezoelectric bending actuators employed in the prior art. So, energy is required only during the process of image refresh.
2. The net force required when refreshing an image in the present invention is less than that required in prior art, for example, in Hillis et al, as the reset force is supplemented by the force applied by a user's fingers, rather than being in opposition thereto.
3. The algorithms of the present invention are energy saving, as they use the stoppers only when absolutely necessary. For example, at the beginning of an image refresh cycle, the first row stopper in the cycle is left 'open' i.e. is not moved, as this is unnecessary.

The following additional advantages are inherent in certain embodiments which use stoppers in parallel by:
1. Using a single actuator to operate two or more stoppers.
2. Dividing pin array into groups and operating all of the groups simultaneously, such that the time to refresh the entire display is the time to refresh of only a single group.
3. Smart algorithm not moving rows is not necessary Also, as stated above, the much smaller number of actuators used in the present invention, not only increases the possible pin density of a tactile display according to the present invention, but also renders a tactile display in accordance with the present invention, far less expensive than those currently available.

A system for holding the pins of a tactile display 12 at lowered, raised and one or more intermediate levels is used with a pin whose construction is depicted in FIGS. 20A-20E. The pin 1201 is generally similar to that shown and described above in conjunction with FIG. 4, and thus is described herein only with regard to the differences therefrom, and so as to understand its operation. As seen, the pin has a plurality of graduated, lateral engagement portions, such as seen in the embodiment of FIG. 4, which define a plurality of surfaces 2111, 2112, and 2113. The number of lateral engagement portions is determined by the number of levels required and the nature of the control mechanism.

Alternatively, a pin can be designed with a plurality of slits (or other openings) at different levels on the pin, the pin being held at respective level by one or more stoppers being inserted into respective slit. Further alternatively, other pin constructions can be used to allow holding the pins at three or more levels, as would occur to one skilled in the art upon reading the present application.

A mechanism for controlling the motion of the pin may be similar to those described hereinabove, except for differences, as described below.

Referring now to FIGS. 20A-20E, a multi-level pin control is seen to include first and second moving stoppers, referenced 911 and 912. First stopper 911 operates as a zero-level stopper 911 for holding pin 1201 in a fully retracted position by positioning on engagement surface 2111 so as to obstruct an upward movement thereof, as shown in FIG. 20A.

When first stopper 911 is moved away from engagement surface 2111, the pin is urged by the compressed resilient member spring 204 to its fully raised position, as shown in FIG. 20D.

Second stopper 912 is adapted to selectively hold the pin at any of a number of predetermined intermediate levels by engaging any of the engagement surfaces 2111, 2112 and 2113, as shown in FIGS. 20B and 20C.

Stoppers 911 and 912 can have various different types of constructions. Typically, they may be formed as a rotating cam which in one position is operative to hold the pin at one of the intermediate levels, and in another position allows the pin to become fully raised, as described in detail hereinbelow with reference to FIGS. 22A-22H.

Before refreshing a tactile image, all of the pins are pushed down by movable pusher 207 in a generally similar manner to that described hereinabove, and as shown in FIG. 20E. At this time, first and second stoppers 911 and 912 must be disengaged from engagement surfaces 2111-2113. Each of the pins is then held in its lowest position, referred to herein also as zero-level positions, by an associated zero-level stopper 911, as shown in FIG. 20A.

It will thus be appreciated that, depending on the specific construction of the pin and the manner in which its movement is controlled, after complete disengagement by first and second stoppers 911 and 912 from the pins, then in order to position a pin at a required height, the following steps are required:

Step 1: If the required position is the highest level, release second stopper 912. If the required level is an intermediate level, second stopper 912 must be re-positioned so as to intercept or engage a selected engagement surface 2111-2113.

Step 2: Release first stopper 911 so as to release pins, allowing them to be urged into an upward position by compression member 204, until it is stopped due to the engagement of one of its engagements surfaces 2112-2113 with second stopper 912, or until it extends to its full height.

In order to control the tactile display 12 where each of its pins is controlled in the manner described with reference to FIGS. 20A-20E, typically a first control mechanism (not shown) is used to control the zero-level stoppers 911 of the pins, and a second control mechanism (not shown) is used to control the stoppers 912 of the pins. The control mechanisms may be similar to any of those shown and described hereinabove, and are thus not described herein.

While the pins are held in the zero-level positions, an algorithm is run in which the level at which each pin is to be held is determined. In accordance with the level determined for each pin, second stopper 912 corresponding to the pin is oriented at a suitable orientation so as to hold the pin at the desired level, or so as to allow the pin to become fully raised.

Once the second stoppers 912 associated with each of the pins have been oriented in a desired manner, the zero-level stoppers 911 of all of the pins are released, except for those pins that are required to be retained at the zero level or retracted position in the tactile image to be displayed. In order to generate a new tactile image, all of the pins are pushed down by moveable plate 207, as shown in FIG. 20E.

Details of this algorithm are described hereinbelow in conjunction with FIGS. 22A-22H.

The construction of stoppers 911 and 912 may, by way of non-limiting example, may have the form of a rotatable cam 915 as described hereinbelow with reference to FIGS. 21A-C. It will however, be appreciated by persons skilled in the art that the stoppers may have other forms, all of which are intended to be within the scope of the present invention.

Reference is now made to FIGS. 21A-21C, which show the construction of stopper 915 as including a rotatable cam, and employed as second stopper 912 for holding a pin at any of a plurality of selected levels, in accordance with some applications of the present invention. As shown, cam 912 is formed with a plurality of teeth 9121, 9122 and 9123, each of a different length, and such that each terminates at a different distance from the axis of rotation, as seen in FIG. 21B. Each of a plurality of stoppers 912 is positioned adjacent to a corresponding plurality of pins such that the extent to which each pin will be permitted to extend when released by first stopper 911 (FIGS. 20A-20E), will vary on the relative positioning between the cam teeth 9121-9123 of different lengths, and the engagement surfaces 2111-2113, which, as shown and described above, are formed of different radii and different heights along the pin.

The cam construction 915 is typically mounted onto a cog 951, the manner of rotation of which is controlled as described hereinbelow in conjunction with FIGS. 22A-22H.

Reference is now made to FIGS. 22A-H, which are schematic illustrations of a mechanism for controlling the movement of a single cam in accordance with some applications of the present invention. In the illustrated example, the cam is shown as second stopper 912, although first stopper 911 may be operated in the same manner, and is not specifically shown herein for purposes of conciseness.

As seen, the control mechanism comprises:

a rotatable cog 951 on which is mounted stopper 912; the vertical positioning of cog 951 may also be adjusted by provision of a step actuator 631 connected to the cog via a rod 641; and a gear rack 361 which by virtue of its engagement with cog 951, is able to cause rotation thereof and thus also of stopper 912, by axial movement as indicated by double-headed arrow 361, causes by operation of a shifting actuator 371.

FIGS. 22A-22H are pairs of views of the above-described control mechanism in different stages of operation, wherein FIGS. 22A, 22C, 22E and 22G are side elevational views of the control mechanism, and FIGS. 22B, 22D, 22F and 22H are corresponding plan views thereof. More specifically, the pairs of views 22A&B, 22C&D, 22E&F and 22G&H depict the following stages of operation:

FIGS. 22A and 22B show the control mechanism in a starting configuration in which cog 951 is disposed below gear rack 361, such that motion of gear rack 361 does not rotate the stopper 912 and none of the cam teeth is in a rotational position to engage an engagement surface of an associated pin moving upwards as described above in conjunction with FIGS. 22A-20D. In order to rotate the stopper 912, the step actuator 631 must be operated so as to raise cog 451 to engage with gear rack 361.

FIGS. 22C-D show the control mechanism wherein cog 451 has been raised such that the cog teeth engage with gear rack 361, such that a movement of gear rack 361 will cause rotation of the cog 451 and thus of stopper 912, selectively rotationally positioning the cam teeth so as to engage a predetermined engagement surface 2111-2113 of the pin, thereby preventing extension of the pin beyond a certain height.

FIGS. 22E-F show stopper 912 after having been rotated, as described, such that cam tooth 9121 is in a position to engage the lowest and widest of the engagement portions 2111, and thus retains the pin at the lowest intermediate level, due to the fact that cam tooth 9121 is the shortest cam tooth and is configured to be able to engage only that engagement portion.

FIGS. 22G-H, however, show stopper 912 after having been rotated, as described, such that tooth 9123, which is the longest cam tooth, is in a position such that it engages the highest and narrowest of the engagement portions 2113, at the highest intermediate level.

It will be appreciated that the illustrated control mechanism is a portion of a entire mechanism controlling an entire tactile display, and that step actuator 631 is thus used to control a column or row of cogs 451, and shift actuator 371 is used to move a gear rack which may serve to selectively rotate all of the cogs in a single row or column.

Thus, in order to control an array of pins, an algorithm that is generally similar to those described hereinabove is run. In order to position all the stoppers 912 associated with the pin array so as to generate a desired tactile image, the step actuator of the first row is operated so as to raise the cogs of the first row such that the cogs of the first row engage the gear racks of respective columns. While the cogs of the first row are engaging the respective gear racks, column actuators 371 (FIGS. 22A-22H) of each of the columns rotate the cams of the each of the pins through a desired rotation angle, based upon the level at which each of the pins in the array is to be held.

Subsequently, the step actuator 631 of the first row is operated so as to lower and thus disengage from the gear racks the cogs of the first row and the column actuators 371 reset the positions of the gear racks to the starting positions. The aforementioned steps are repeated for each of the rows of the array.

It is noted although certain steps have been described as being applied to rows and other steps have been described as being applied to columns, these steps are interchangeable. Thus, steps described with respect to the control of rows may be applied to control columns, and vice versa.

It is also noted that the algorithm described here is a basic algorithm allowing its variation for time, energy and/or both time-energy savings as it was shown in FIGS. 8-10.

It is noted that although FIGS. 22A-H show a control mechanism that uses second stopper 912 to hold pins 201, for some applications, other elements may be used to hold the pins at intermediate levels. For example, elliptical shaped holders could be used that hold the pins at given levels, by interacting with respective surfaces of leveler 205 of the pin construction, by rotation of the elliptical holders through respective angles.

As described hereinabove with reference to FIGS. 21A-22H, while a single stopper is used to hold a pin at a plurality of intermediate levels, pin 201 of the present invention is seen to be formed with a plurality of engagement portions and surfaces, for engagement at different levels. It will however be appreciated that as an alternative solution, the number of engagement portions and surfaces may be reduced, while providing additional stoppers.

Referring now to FIGS. 23A-23D, there is seen a pin 2201 and a height control mechanism, wherein the pin has a single engagement surface 2015 for engagement with one of a plurality of stoppers 206, 991, 992, 993 and so on, depending on the number of levels desired.

FIGS. 23A and 23B show the pin 201 and elements of the control mechanism in side elevational and top views, in which stationary plates are referenced 203 and 208, respectively, as in hereinabove-described embodiments. The stopper 206 seen to be engaging surface 2215 holds the pin 2201 at the zero level, against the urging force of resilient compression member 204. None of the stoppers 991, 992 and 993 are engaged with pin 2201 at this time. The stoppers 206, 991, 992, 993 can be implemented either as elements that can move back and forth, into and out of engagement with engagement surface 2215, depending on the position of the pin 2201, as rotating cams such as shown and described in conjunction with FIGS. 21A-21D, or as any other type of element that can be brought into selective engagement with engagement surface 2215, as described herein.

In the present example, in which four stoppers are provided, it is possible to position pin 2201 at any one of five different heights, as follows:

zero level—defined by stopper 206;

intermediate levels—defined by stoppers 991, 992, 993; and upper level—defined by the maximum extent to which pin 2201 is permitted to extend; this will normally be reached either when resilient element 204 is no longer compressed, or when engagement surface 2015 meets pusher 207 or top stationary plate 208, in accordance with the specific construction.

In contrast to FIGS. 23A and 23B which show pin 2201 in a position of maximum retraction, FIGS. 23C and 23D show pin 2201 at a second intermediate height, after release by stopper 206, but when engaged by intermediate stopper 992.

An algorithm controlling motion and locations of a single pin consists in following. Suppose, the pin 2201 is at its zero height level as shown in FIGS. 23A and 23B, where it is held by stopper 206; and it is desired to move the pin to the second intermediate level as shown in FIGS. 23C and 23D. The following steps are then required for this change in the position of pin 2201 to occur:

the stopper 992 is placed in its "active" position, namely, where it will engage and obstruct the movement therepast of engagement surface 2215, so as to position pin 2201 as desired; and the stopper 206 releases pin 2201 so that it is urged upwards by resilient element 204, such that engagement surface 2215 meets stopper 992, halting the movement of the pin. The pin will remain in this position until a command is issued to change its position under pressure of the pusher 207.

It is noted that any movement of any of the other control elements, apart from the stopper 992 and the pusher 207, cannot change the pin's position.

When a command to refresh the tactile image is issued, the following takes place:

all of the intermediate stoppers 991, 992, 993 are opened so as to allow free movement of the pins;

pusher 207 pushes each pin to its zero position; and the stoppers 206 are closed, so as to lock all of the pins in their closed, zero or retracted positions. Thereafter, the pins may be selectively released in order to provide a tactile image.

In order to control the tactile display 12 which is a rectangular matrix of such pins and on the basis of the control method shown and described in conjunction with FIGS. 23A-23D, there are provided a set of control mechanisms such as described hereinabove in conjunction with FIGS. 6A-7B. The number of such mechanisms is equal to the number of stoppers which, in turn, is equal to number of height levels minus one.

Figure 24:
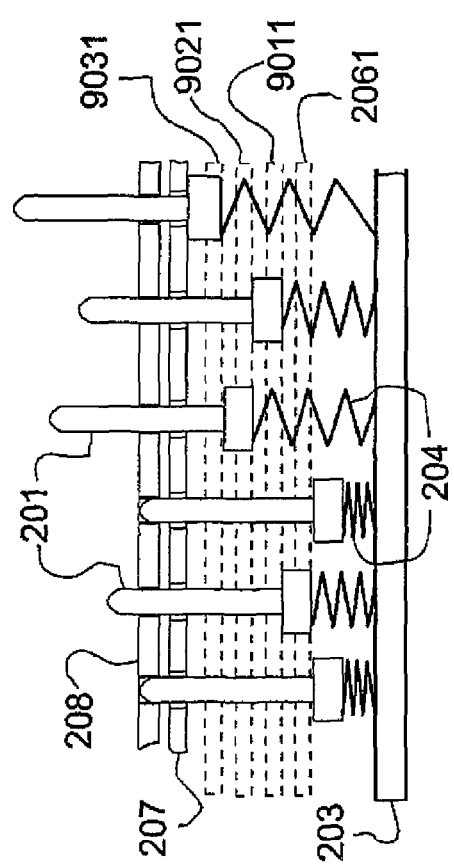
FIG. 24 shows a manner in which the movement of the pin of FIGS. 23A-23D may be controlled.

Referring now to FIG. 24, there is shown in schematic form a mechanism for controlling a tactile display having five height levels. In addition to the elements shown and described hereinabove, including pins 201, stationary plates 203 and 208, resilient element 204, and pusher 207, the present embodiments includes four mechanisms for controlling stoppers on each of four levels. These include:

a control mechanism 2061 which controls the zero level stoppers, denoted by reference number 206 in FIGS. 23A-23D; and three mechanisms, referenced 9011, 9021 and 9031, each of them controlling the stoppers 991, 992 and 993, as shown and described above in conjunction with FIGS. 23A-23D.

It will be appreciated by persons skilled in the art that the control mechanisms described herein are mechanically and logically equivalent to that described in conjunction with FIGS. 6-10, and thus do not need further description.

It will further be appreciated that in comparison to the construction and method of operation described above in conjunction with FIGS. 20A-22H, the construction and consequent method of control described in conjunction with FIGS. 23A-24 permit a more rapid refreshing of a tactile display. This is due to the fact that as all of the intermediate control mechanisms are on different levels, they may be operated in parallel, rather than in series as with the previous embodiment.

Although pin holding constructions and pin holding mechanisms are shown having specific configurations, the scope of the present invention includes using pin holding constructions and pin holding mechanisms that operate generally in accordance with the techniques described herein, but having different configurations to the specific configurations described herein, which would occur to persons skilled in the art upon reading the present application.

The invention claimed is:

1. A pin construction for use with a tactile display, said pin construction including:

a base;

a movable pin having a free end for tactile sensing by a user;

a resilient element for supporting said pin on said base between a first, extended position relative to said base and a second, retracted position, said resilient element being operative to support said pin in said first position when at rest, and being further operative to urge said pin from said second position to said first position in the presence of an opposing force;

a selectably actuable stopper for lockably engaging said pin when in said second position; and a reset element for selectably forcing said pin from said first position to said second position by application to said pin of a variable force $\delta$ wherein $X < \delta \leq Y$, wherein said resilient element applies an urging force having an axial component equal to X, said pin being susceptible to move from said first position to said second position in the presence of an opposing force having an axial component Y, wherein $Y > X$.

2. The pin construction according to claim 1, wherein said pin is susceptible to application thereto of an axial component of a force F applied to its free end by a user, and wherein $\delta = Y - F$.

3. The pin construction according to claim 1, wherein said pin has at least one engagement portion formed thereon, for engagement by said stopper.

4. The pin construction according to claim 1, wherein said first and second positions define the maximum range of movement of said pin, said selectably actuable stopper is a main stopper, and wherein said pin construction also includes at least one additional stopper for lockably engaging said pin in at least one intermediate position, between said first and second positions.

5. The pin construction according to claim 4, wherein said pin has a first engagement portion formed thereon for engagement by said main stopper, and at least a second engagement portion formed thereon for engagement by said at least one additional stopper.

6. A tactile display which includes:

a base;

a plurality of movable pins having free ends adapted for tactile sensing by a user, said plurality of movable pins being arranged in rows and columns such that each said pin is locatable in a predetermined row and column, each said pin being movable between a first, extended position and a said second, retracted position with respect to said base so as to selectively display tactilely sensible data;

a resilient element for supporting each said pin in said first position when at rest, and being further operative to urge said pin from said second position to said first position in the presence of an opposing force;

at least one reset element for selectably lowering said plurality of pins from said first, relatively raised position to said second, relatively lowered position;

a plurality of selectably actuable row stoppers for lockably engaging said rows of pins when in said second position; and a plurality of selectably actuable column stoppers for lockably engaging said columns of pins when in said second position, such that each pin remains in said second position, even after disengagement therefrom by one of said row stoppers or one of said column stoppers.

7. The tactile display according to claim 6, wherein each said row stopper and each said column stopper has a single actuator, such that the total number of actuators employed for said plurality of row stoppers and said plurality of column stoppers equals R+C, wherein R=the total number of rows, and C=the total number of columns.

8. The tactile display according to claim 7, also including: at least two actuators for said plurality of row stoppers, and at least two actuators for said plurality of column stoppers.

9. The tactile display according to claim 6, wherein a set of Sr row stoppers is controlled by a single set Ar of row actuators, and a set of Sc column stoppers is controlled by a single set Ac of column actuators, wherein at least one of the following conditions applies:

(i) Ar<Sr and (ii) Ac<Sc such that the total number of row actuators and column actuators is less than the total number of row and column stoppers.

10. The tactile display according to claim 6, wherein said resilient support applies to each said pin an urging force having an axial component equal to X, said pin being susceptible to move from said first position to said second position in the presence of a force having an axial component Y, wherein Y>X, and wherein said reset is selectably operable to force said pin from said first position to said second position by application thereto of a variable force $\delta$ wherein X<$\delta$≤Y.

11. The tactile display according to claim 10, wherein said pin is susceptible to application thereto of an axial component of a force F applied to its free end by a user, and wherein $\delta$=Y−F.

12. The tactile display according to claim 6, wherein each said pin has at least two engagement portions formed thereon, for selectable engagement by one of the following:

one of said row stoppers, one of said column stoppers, or one of said row stoppers and one of said column stoppers.

13. The tactile display according to claim 6, wherein said first and second positions define the maximum range of movement of each said pin, said selectably actuable row and column stoppers are main stoppers, and wherein said tactile display also includes at least one additional plurality of row stoppers and at least one additional plurality of column stoppers for lockably engaging said pins in at least one intermediate position, between said first and second positions.

14. The tactile display according to claim 6, wherein said first and second positions define the maximum range of movement of each said pin, and each said pin has a first engagement portion formed thereon for engagement by said main stoppers, and at least one or more additional engagement portions formed thereon, and wherein said tactile display also includes at least one additional plurality of row stoppers and at least one additional plurality of column stoppers for lockably engaging said at least one or more additional engagement portions of each pin so as to lock said pins in at least one intermediate position, between said first and second positions.

* * * * *